(12) United States Patent
Hassard et al.

(10) Patent No.: US 12,468,798 B2
(45) Date of Patent: Nov. 11, 2025

(54) TECHNIQUES FOR MANAGING ARTIFICIAL INTELLIGENCE AGENTS USING USER-CONTROLLED AUTHORIZATION NETWORK TOKENS

(71) Applicant: OKTA, INC., San Francisco, CA (US)

(72) Inventors: Ian Hassard, Waterloo (CA); Paulo Eduardo Bueno Nascimento, Redmond, WA (US); Matthew James Pereira, Halifax (CA); Tomas Carter, Manchester (GB); Tausif Ahmed, North York (CA)

(*) Notice: Subject to any disclaimer, the term of this patent is extended or adjusted under 35 U.S.C. 154(b) by 142 days.

(21) Appl. No.: 18/427,008

(22) Filed: Jan. 30, 2024

(65) Prior Publication Data

US 2025/0245311 A1     Jul. 31, 2025

(51) Int. Cl.
    *G06F 21/44*     (2013.01)

(52) U.S. Cl.
    CPC .................. *G06F 21/44* (2013.01)

(58) Field of Classification Search
None
See application file for complete search history.

(56) References Cited

U.S. PATENT DOCUMENTS

| | | | | |
|---|---|---|---|---|
| 10,193,992 B2 * | 1/2019 | Wagenknecht | ....... | H04L 67/141 |
| 2011/0154376 A1 * | 6/2011 | Consul | .......... | G06F 16/95 |
| | | | | 719/328 |
| 2021/0126977 A1 | 4/2021 | Ruflin et al. | | |
| 2024/0241743 A1 * | 7/2024 | Gupta | ......... | G06F 8/61 |
| 2024/0356854 A1 * | 10/2024 | Sowpati | ........ | H04L 47/125 |

OTHER PUBLICATIONS

"International Search Report and Written Opinion of the International Searching Authority," issued in connection with Int'l Appl. No. PCT/US2025/011081, dated Apr. 16, 2025 (14 pages).
Guohao. L., et al., "CAMEL: Communicative Agents for "Mind" Exploration of Large Language Model Society", Cornell University Library, Nov. 2, 2023.
Liang, Y., et al., "TaskMatrixAI: Completing Tasks by Connecting Foundation Models with Millions of APIs", Intelligent Computing, vol. 3, Mar. 29, 2023.
Salvaris, M, et al., "Deep Learning with Azure : Building and Deploying Artificial Intelligence Solutions on the Microsoft AI Platform", Jul. 1, 2018.

* cited by examiner

*Primary Examiner* — Joshua Joo
(74) *Attorney, Agent, or Firm* — Holland & Hart LLP

(57) ABSTRACT

A user of an identity management system may configure a software agent with a set of parameters within one or more user interfaces of an agent management service. The set of parameters may include an identifier of an application programming interface (API) endpoint of a first service that the software agent is authorized to query and one or more permissions associated with queries to the API endpoint by the software agent. Further, the user may receive an authentication token for the software agent from the agent management service. The software agent may use the authentication token for accessing resources of the service via the API endpoint in accordance with the one or more permissions. Thus, the user may configure the first software agent with the authentication token to enable the software agent to perform the queries to the API endpoint of the first service.

20 Claims, 14 Drawing Sheets

Software Agent Name (required) ⎯605

| *name* |

A human-readable identifier up to 40 characters long. This will be displayed in the software agents list.

Description                                                  610

| *e.g., a helpful software agent* |

Help yourself remember what purpose this software agent serves, if it isn't easy to guess based on its name.

[ Continue ] [ Cancel ]

API Name (required) — 715

*name*

Name this API so that you can remember what the API key refers to later on.

API Key (required) — 720

*key*

The key for the API you want your software agent to interact with.

705

Entity (required) — 725

*name*

Provide an entity value for this API key to interact with. Refer to the API's documentation for more info..

Entity Permissions (required) — 730
- ☑ Create    ☑ Read
- ☑ Update    ☐ Delete Select the actions you want your agent to be allowed to perform in the context of this entity.

710

➕ Add Another Entity — 735

➕ Add Another API — 740

[ Back ] [ Continue ] [ Cancel ]

TECHNIQUES FOR MANAGING ARTIFICIAL INTELLIGENCE AGENTS USING USER-CONTROLLED AUTHORIZATION NETWORK TOKENS

FIELD OF TECHNOLOGY

The present disclosure relates generally to identity management, and more specifically to techniques for managing artificial intelligence (AI) agents using user-controlled authorization network (UCAN) tokens.

BACKGROUND

An identity management system may be employed to manage and store various forms of user data, including usernames, passwords, email addresses, permissions, roles, group memberships, etc. The identity management system may provide authentication services for applications, devices, users, and the like. The identity management system may enable organizations to manage and control access to resources, for example, by serving as a central repository that integrates with various identity sources. The identity management system may provide an interface that enables users to access a multitude of applications with a single set of credentials.

SUMMARY

A method for software agent authorization by an apparatus is described. The method may include configuring, within one or more user interfaces of an agent management service, a first software agent with a set of parameters, the set of parameters including at least an identifier of an application programming interface (API) endpoint of a first service that the first software agent is authorized to query and one or more permissions associated with queries to the API endpoint by the first software agent, receiving, from the agent management service, an authentication token for the first software agent, the authentication token being usable by the first software agent for accessing resources of the first service via the API endpoint in accordance with the one or more permissions, and configuring the first software agent with the authentication token to enable the first software agent to perform the queries to the API endpoint of the first service.

An apparatus for software agent authorization is described. The apparatus may include one or more memories storing processor executable code, and one or more processors coupled with the one or more memories. The one or more processors may individually or collectively be operable to execute the code to cause the apparatus to configuring, within one or more user interfaces of an agent management service, a first software agent with a set of parameters, the set of parameters include at least an identifier of an API endpoint of a first service that the first software agent is authorized to query and one or more permissions associated with queries to the API endpoint by the first software agent, receive, from the agent management service, an authentication token for the first software agent, the authentication token being usable by the first software agent for accessing resources of the first service via the API endpoint in accordance with the one or more permissions, and configure the first software agent with the authentication token to enable the first software agent to perform the queries to the API endpoint of the first service.

Another apparatus for software agent authorization is described. The apparatus may include means for configuring, within one or more user interfaces of an agent management service, a first software agent with a set of parameters, the set of parameters including at least an identifier of an API endpoint of a first service that the first software agent is authorized to query and one or more permissions associated with queries to the API endpoint by the first software agent, means for receiving, from the agent management service, an authentication token for the first software agent, the authentication token being usable by the first software agent for accessing resources of the first service via the API endpoint in accordance with the one or more permissions, and means for configuring the first software agent with the authentication token to enable the first software agent to perform the queries to the API endpoint of the first service.

A non-transitory computer-readable medium storing code for software agent authorization is described. The code may include instructions executable by one or more processors to configuring, within one or more user interfaces of an agent management service, a first software agent with a set of parameters, the set of parameters include at least an identifier of an API endpoint of a first service that the first software agent is authorized to query and one or more permissions associated with queries to the API endpoint by the first software agent, receive, from the agent management service, an authentication token for the first software agent, the authentication token being usable by the first software agent for accessing resources of the first service via the API endpoint in accordance with the one or more permissions, and configure the first software agent with the authentication token to enable the first software agent to perform the queries to the API endpoint of the first service.

Some examples of the method, apparatus, and non-transitory computer-readable medium described herein may further include operations, features, means, or instructions for selecting, within a first user interface of the one or more user interfaces of the agent management service, the first software agent from one or more software agents displayed within the first user interface, reconfiguring, within a second user interface of the agent management service, the first software agent based on selecting the first software agent from the one or more software agents, and receiving, from the agent management service, an updated authentication token for the first software agent based on the reconfiguration of the first software agent, where the first software agent may be configured with the updated authentication token to perform the queries to the API endpoint of the first service.

Some examples of the method, apparatus, and non-transitory computer-readable medium described herein may further include operations, features, means, or instructions for reconfiguring the first software agent includes updating the identifier of the API endpoint of the first service and the one or more permissions associated with the queries to the API endpoint by the first software agent, adding another identifier of a second API endpoint of a second service that the first software agent may be authorized to query and one or more permissions associated with queries to the second API endpoint by the first software agent, removing one or more parameters of the first software agent, or any combination thereof.

Some examples of the method, apparatus, and non-transitory computer-readable medium described herein may further include operations, features, means, or instructions for selecting, within a first user interface of the one or more user interfaces of the agent management service, to generate the first software agent, the first software agent being configured within the first user interface of the agent management service based on the selection within the first user interface of the agent management service.

In some examples of the method, apparatus, and non-transitory computer-readable medium described herein, configuring the first software agent via the agent management service may include operations, features, means, or instructions for inputting, within a first user interface of the one or more user interfaces of the agent management service, an identifier for the first software agent, inputting, within a second user interface of the one or more user interfaces of the agent management service, an identifier of the first service, the API endpoint of the first service, the one or more permissions associated with the queries to the API endpoint by the first software agent, or any combination thereof, and receiving, via a third user interface of the one or more user interfaces of the agent management service, an indication of a client identifier and a secret token for the first software agent, where the authentication token may be generated based on the client identifier and the secret token of the first software agent.

In some examples of the method, apparatus, and non-transitory computer-readable medium described herein, receiving the authentication token for the first software agent may include operations, features, means, or instructions for receiving, from the agent management service, a header, a payload, and a signature of the authentication token, where a portion of the payload of the authentication token includes the API endpoint of the first service, where the signature of the authentication token includes a private key, and where the authentication token may be usable by the first software agent for accessing the resources of the first service via the API endpoint of the first service based on the portion of the payload including the API endpoint of the first service being associated with the signature of the authentication token.

In some examples of the method, apparatus, and non-transitory computer-readable medium described herein, the one or more permissions include read permissions, write permissions, creation permissions, deletion permissions, or any combination thereof.

In some examples of the method, apparatus, and non-transitory computer-readable medium described herein, the first software agent performs the queries to the API endpoint of the first service on behalf of a first user of a set of users.

In some examples of the method, apparatus, and non-transitory computer-readable medium described herein, the first service includes a native application or a web-based application.

In some examples of the method, apparatus, and non-transitory computer-readable medium described herein, the agent management service includes an application, a dashboard of an application, a user interface of an application, or any combination thereof.

BRIEF DESCRIPTION OF THE DRAWINGS

FIGS. 6 through 9 show examples of user interfaces that supports techniques for managing AI agents using UCAN tokens in accordance with aspects of the present disclosure.

DETAILED DESCRIPTION

Figure 1:
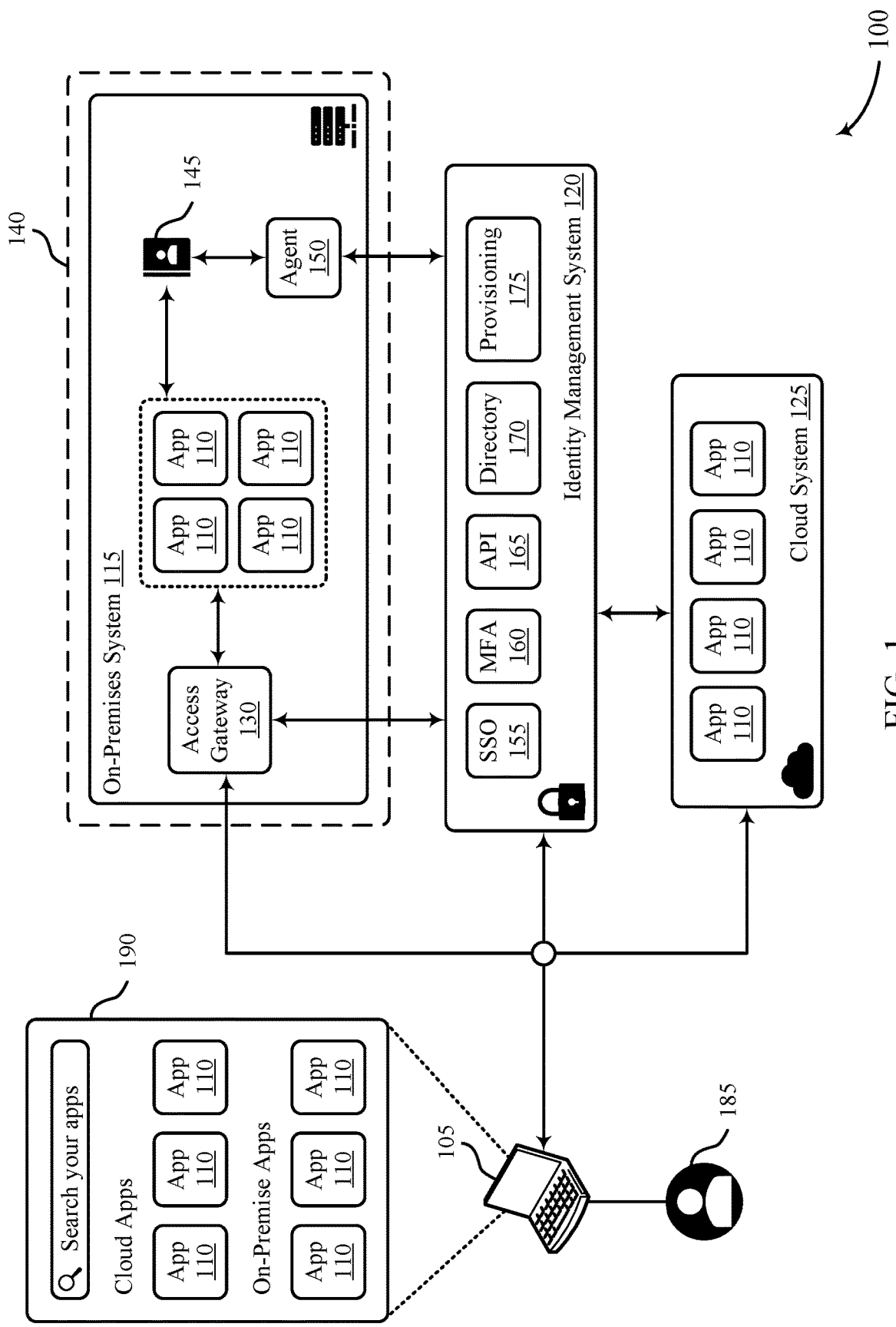
FIGS. 1 and 2 illustrate examples of a computing system that supports techniques for managing artificial intelligence (AI) agents using user-controlled authorization network (UCAN) tokens in accordance with aspects of the present disclosure.

A user of an identity management system, such as a developer, may configure software agents to interact with applications or services on behalf of the user. A software agent may be a service that is capable of autonomously querying other services on behalf of users and accessing resources of the queried services to provide data from to the users. To perform such operations, users may configure the software agents within an agent management service. The agent management service may be a service configured to manage and control configured software agents. In some cases, to access the data associated with a user from a service, a software agent may be configured with the credentials of the user for the service. However, configuring a software agent with the credentials of a user may introduce one or more security vulnerabilities due to the software agent being capable of accessing the data associated with a user without additional authorization.

In accordance with various techniques of the present disclosure, a user may configure a first software agent within the agent management service using a set of parameters. In some cases, the set of parameters may include an identifier of an application programming interface (API) endpoint of a first service that the first software agent is authorized to query, and one or more permissions associated with the queries to the API endpoint by the first software agent. Based on the configuration of the first software agent, the agent management service may then generate the authentication token for the first software agent. As such, the first software agent may use the authentication token to access one or more resources of the first service via the API endpoint of the first service in accordance with the one or more permissions of the first software agent. That is, the first software agent may use the authentication token to perform queries to the API endpoint of the first service in accordance with the configured permissions of the first software agent. Further, the user may configure the first software agent with the authentication token to enable the first software agent to perform the queries to the API endpoint of the first service. Moreover, the authentication token may be used to authorize access by the software agent to the resources of the first service on the behalf of the user (e.g., without necessitating that the software agent access the credentials of the user). In other words, by configuring the software agent with the authentication token, the user may refrain from providing user credentials to the software agent, which may lead to increased security, among other benefits.

In some examples, the user may use the agent management service to select a software agent from a list of one or more software agents displayed within an interface of the agent management service. Further, the user may select a first software agent and reconfigure the first software agent such that the user receives an updated authentication token from the agent management service. In some cases, reconfiguring a software agent may include updating the identifier of the API endpoint of the service associated with the software agent, updating the permissions of the software agent, or a combination thereof. Moreover, the permissions of a software agent may include read permissions, write permissions, creation permissions, deletion permissions, or any combination thereof. Thus, the user may configure a software agent (e.g., the first software agent) with an authentication token authorizing the software agent to read data, write data, create data, delete data, or any combination thereof where the data is associated with the service that the software agent is authorized to query.

Therefore, the authentication token may enable software agents the ability to access resources of a service in accordance with a set of configured permissions without the software agent accessing the credentials of the user, which may enhance the security of the computing system, for example, by reducing the risk of unauthorized access to resources of service. Further, by having software agents configured with an authentication token, users may have more precise control over the authorizing the actions a software agent is performing, thereby preventing software agents from accessing or modifying resources outside of the configured permissions of the software agent. Additionally, or alternatively, one or more techniques of the present disclosure may enable users to reconfigure software agents and configure additional software agents within the agent management system to allow for a flexible and efficient management of the software agents. One or more techniques of the present disclosure may describe software agent authorization that enables centralized management and control over software agents configured with the agent management system.

Aspects of the disclosure are initially described in the context of a computing system. Additional aspects of the disclosure are described with reference to a computing system, flowcharts, user interface diagrams, and a process flow/Aspects of the disclosure are further illustrated by and described with reference to apparatus diagrams, system diagrams, and flowcharts that relate to techniques for managing artificial intelligence (AI) agents using user-controlled authorization network (UCAN) tokens.

FIG. 1 illustrates an example of a computing system 100 that supports techniques for managing AI agents using UCAN tokens in accordance with various aspects of the present disclosure. The computing system 100 includes a computing device 105 (such as a desktop, laptop, smartphone, tablet, or the like), an on-premises system 115, an identity management system 120, and a cloud system 125, which may communicate with each other via a network, such as a wired network (e.g., the Internet), a wireless network (e.g., a cellular network, a wireless local area network (WLAN)), or both. In some cases, the network may be implemented as a public network, a private network, a secured network, an unsecured network, or any combination thereof. The network may include various communication links, hubs, bridges, routers, switches, ports, or other physical and/or logical network components, which may be distributed across the computing system 100.

The on-premises system 115 (also referred to as an on-premises infrastructure or environment) may be an example of a computing system in which a client organization owns, operates, and maintains its own physical hardware and/or software resources within its own data center(s) and facilities, instead of using cloud-based (e.g., off-site) resources. Thus, in the on-premises system 115, hardware, servers, networking equipment, and other infrastructure components may be physically located within the "premises" of the client organization, which may be protected by a firewall 140 (e.g., a network security device or software application that is configured to monitor, filter, and control incoming/outgoing network traffic). In some examples, users may remotely access or otherwise utilize compute resources of the on-premises system 115, for example, via a virtual private network (VPN).

In contrast, the cloud system 125 (also referred to as a cloud-based infrastructure or environment) may be an example of a system of compute resources (such as servers, databases, virtual machines, containers, and the like) that are hosted and managed by a third-party cloud service provider using third-party data center(s), which can be physically co-located or distributed across multiple geographic regions. The cloud system 125 may offer high scalability and a wide range of managed services, including (but not limited to) database management, analytics, machine learning (ML), AI, etc. Examples of cloud systems 125 include (AMAZON WEB SERVICES) AWS®, MICROSOFT AZURE®, GOOGLE CLOUD PLATFORM®, ALIBABA CLOUD®, ORACLE® CLOUD INFRASTRUCTURE (OCI), and the like.

The identity management system 120 may support one or more services, such as a single sign-on (SSO) service 155, a multi-factor authentication (MFA) service 160, an API service 165, a directory management service 170, or a provisioning service 175 for various on-premises applications 110 (e.g., applications 110 running on compute resources of the on-premises system 115) and/or cloud applications 110 (e.g., applications 110 running on compute resources of the cloud system 125), among other examples of services. The SSO service 155, the MFA service 160, the API service 165, the directory management service 170, and/or the provisioning service 175 may be individually or collectively provided (e.g., hosted) by one or more physical machines, virtual machines, physical servers, virtual (e.g., cloud) servers, data centers, or other compute resources managed by or otherwise accessible to the identity management system 120.

A user 185 may interact with the computing device 105 to communicate with one or more of the on-premises system 115, the identity management system 120, or the cloud system 125. For example, the user 185 may access one or more applications 110 by interacting with an interface 190 of the computing device 105. In some implementations, the user 185 may be prompted to provide some form of identification (such as a password, personal identification number (PIN), biometric information, or the like) before the interface 190 is presented to the user 185. In some implementations, the user 185 may be a developer, customer, employee, vendor, partner, or contractor of a client organization (such as a group, business, enterprise, non-profit, or startup that uses one or more services of the identity management system 120). The applications 110 may include one or more on-premises applications 110 (hosted by the on-premises system 115), mobile applications 110 (configured for mobile devices), and/or one or more cloud applications 110 (hosted by the cloud system 125).

The SSO service 155 of the identity management system 120 may allow the user 185 to access multiple applications 110 with one or more credentials. Once authenticated, the user 185 may access one or more of the applications 110 (for example, via the interface 190 of the computing device 105). That is, based on the identity management system 120 authenticating the identity of the user 185, the user 185 may obtain access to multiple applications 110, for example, without having to re-enter the credentials (or enter other credentials). The SSO service 155 may leverage one or more authentication protocols, such as Security Assertion Markup Language (SAML) or OpenID Connect (OIDC), among other examples of authentication protocols. In some examples, the user 185 may attempt to access an application 110 via a browser. In such examples, the browser may be redirected to the SSO service 155 of the identity management system 120, which may serve as the identity provider (IdP). For example, in some implementations, the browser (e.g., the user's request communicated via the browser) may be redirected by an access gateway 130 (e.g., a reverse proxy-based virtual application configured to secure web applications 110 that may not natively support SAML or OIDC).

In some examples, the access gateway 130 may support integrations with legacy applications 110 using hypertext transfer protocol (HTTP) headers and Kerberos tokens, which may offer universal resource locator (URL)-based authorization, among other functionalities. In some examples, such as in response to the user's request, the IdP may prompt the user 185 for one or more credentials (such as a password, PIN, biometric information, or the like) and the user 185 may provide the requested authentication credentials to the IdP. In some implementations, the IdP may leverage the MFA service 160 for added security. The IdP may verify the user's identity by comparing the credentials provided by the user 185 to credentials associated with the user's account. For example, one or more credentials associated with the user's account may be registered with the IdP (e.g., previously registered, or otherwise authorized for authentication of the user's identity via the IdP). The IdP may generate a security token (such as a SAML token or Oath 2.0 token) containing information associated with the identity and/or authentication status of the user 185 based on successful authentication of the user's identity.

The IdP may send the security token to the computing device 105 (e.g., the browser or application 110 running on the computing device 105). In some examples, the application 110 may be associated with a service provider (SP), which may host or manage the application 110. In such examples, the computing device 105 may forward the token to the SP. Accordingly, the SP may verify the authenticity of the token and determine whether the user 185 is authorized to access the requested applications 110. In some examples, such as examples in which the SP determines that the user 185 is authorized to access the requested application, the SP may grant the user 185 access to the requested applications 110, for example, without prompting the user 185 to enter credentials (e.g., without prompting the user to log-in). The SSO service 155 may promote improved user experience (e.g., by limiting the number of credentials the user 185 has to remember/enter), enhanced security (e.g., by leveraging secure authentication protocols and centralized security policies), and reduced credential fatigue, among other benefits.

The MFA service 160 of the identity management system 120 may enhance the security of the computing system 100 by prompting the user 185 to provide multiple authentication factors before granting the user 185 access to applications 110. These authentication factors may include one or more knowledge factors (e.g., something the user 185 knows, such as a password), one or more possession factors (e.g., something the user 185 is in possession of, such as a mobile app-generated code or a hardware token), or one or more inherence factors (e.g., something inherent to the user 185, such as a fingerprint or other biometric information). In some implementations, the MFA service 160 may be used in conjunction with the SSO service 155. For example, the user 185 may provide the requested login credentials to the identity management system 120 in accordance with an SSO flow and, in response, the identity management system 120 may prompt the user 185 to provide a second factor, such as a possession factor (e.g., a one-time passcode (OTP), a hardware token, a text message code, an email link/code). The user 185 may obtain access (e.g., be granted access by the identity management system 120) to the requested applications 110 based on successful verification of both the first authentication factor and the second authentication factor.

The API service 165 of the identity management system 120 can secure APIs by managing access tokens and API keys for various client organizations, which may enable (e.g., only enable) authorized applications (e.g., one or more of the applications 110) and authorized users (e.g., the user 185) to interact with a client organization's APIs. The API service 165 may enable client organizations to implement customizable login experiences that are consistent with their architecture, brand, and security configuration. The API service 165 may enable administrators to control user API access (e.g., whether the user 185 and/or one or more other users have access to one or more particular APIs). In some examples, the API service 165 may enable administrators to control API access for users via authorization policies, such as standards-based authorization policies that leverage OAuth 2.0. The API service 165 may additionally, or alternatively, implement role-based access control (RBAC) for applications 110. In some implementations, the API service 165 can be used to configure user lifecycle policies that automate API onboarding and off-boarding processes.

The directory management service 170 may enable the identity management system 120 to integrate with various identity sources of client organizations. In some implementations, the directory management service 170 may communicate with a directory service 145 of the on-premises system 115 via a software agent 150 installed on one or more computers, servers, and/or devices of the on-premises system 115. Additionally, or alternatively, the directory management service 170 may communicate with one or more other directory services, such as one or more cloud-based directory services. As described herein, a software agent 150 generally refers to a software program or component that operates on a system or device (such as a device of the on-premises system 115) to perform operations or collect data on behalf of another software application or system (such as the identity management system 120).

The provisioning service 175 of the identity management system 120 may support user provisioning and deprovisioning. For example, in response to an employee joining a client organization, the identity management system 120 may automatically create accounts for the employee and provide the employee with access to one or more resources via the accounts. Similarly, in response to the employee (or some other employee) leaving the client organization, the identity management system 120 may autonomously deprovision the employee's accounts and revoke the employee's access to the one or more resources (e.g., with little to no intervention from the client organization). The provisioning service 175 may maintain audit logs and records of user deprovisioning events, which may help the client organization demonstrate compliance and track user lifecycle changes. In some implementations, the provisioning service 175 may enable administrators to map user attributes and roles (e.g., permissions, privileges) between the identity management system 120 and connected applications 110, ensuring that user profiles are consistent across the identity management system 120, the on-premises system 115, and the cloud system 125.

Although not depicted in the example of FIG. 1, a person skilled in the art would appreciate that the identity management system 120 may support or otherwise provide access to any number of additional or alternative services, applications 110, platforms, providers, or the like. In other words, the functionality of the identity management system 120 is not limited to the exemplary components and services mentioned in the preceding description of the computing system 100. The description herein is provided to enable a person skilled in the art to make or use the present disclosure. Various modifications to the present disclosure will be readily apparent to those skilled in the art, and the generic principles defined herein may be applied to other variations without departing from the scope of the present disclosure. Accordingly, the present disclosure is not limited to the examples and designs described herein, but is to be accorded the broadest scope consistent with the principles and novel features disclosed herein.

In some examples of the computing system 100, users 185 (e.g., developers, end users 185, or a combination thereof) of an on-premises system 115, an identity management system 120, a cloud system 125, or any combination thereof may configure software agents to interact with applications 110 or services on behalf of the user 185. For example, in accordance with one or more techniques of the present disclosure, a user 185 may configure (e.g., develop) a first software agent within an agent management service using a set of parameters. In some cases, the user 185 may use the agent management service via an interface 190 of a computing device 105. Further, the set of parameters may include an identifier of an API endpoint of a first service that the first software agent is authorized to query, and one or more permissions associated with the queries to the API endpoint by the first software agent (e.g., via the API service 165). Based on the configuration of the first software agent, the agent management service may then generate the authentication token for the first software agent. The first software agent may then use the authentication token to access one or more resources of the first service via the API endpoint of the first service in accordance with the one or more permissions of the first software agent. Further, the user 185 may configure the first software agent with the authentication token to enable the first software agent to perform the queries to the API endpoint of the first service.

For example, the first service may be a group-based communication platform that includes one or more channels for different conversations between users 185 and the first software agent may be configured to access resources from a respective channel of the group-based communication platform. Therefore, a user 185 (e.g., a developer user 185) may configure the first software agent with an indication of an API endpoint of a first channel of the group-based communication platform. Further, the developer user 185 of the first software agent may configure the first software agent with one or more permissions including read permissions and write permissions. Therefore, the first software agent may be capable of reading messages from and writing messages to the first channel of the group-based communication platform. Further, the user 185 may receive an authentication token from the agent management service that enables the first software agent to access resources of the first channel of the group-based communication platform via the API endpoint and in accordance with the one or more permissions (e.g., read/write permissions). The user 185 may then configure the first software agent with the authentication token to enable the first software agent to perform queries to the API endpoint of the first channel of the group-based communication platform. Therefore, the first software agent may be authorized, via the authentication token, to read messages from and write messages to the first channel of the group-based communication platform on the behalf of the user 185.

Thus, the authentication token may enable software agents the ability to access resources of a service in accordance with a set of configured permissions without the software agent accessing the credentials of a user 185. One or more techniques of the present disclosure may enhance the security of the computing system 100 by reducing the risk of unauthorized access to resources of service. Further, by having software agents configured with an authentication token, users 185 may have more precise control over the actions a software agent is authorized to perform, thereby preventing software agents from accessing or modifying resources outside of the configured permissions of the software agent. Additionally, or alternatively, one or more techniques of the present disclosure may enable users 185 the ability to reconfigure software agents and configure additional software agents within the agent management system to allow for a flexible and efficient management of the software agents. One or more techniques of the present disclosure may provide for software agent authorization that enables centralized management and control over software agents configured with the agent management system.

Figure 2:
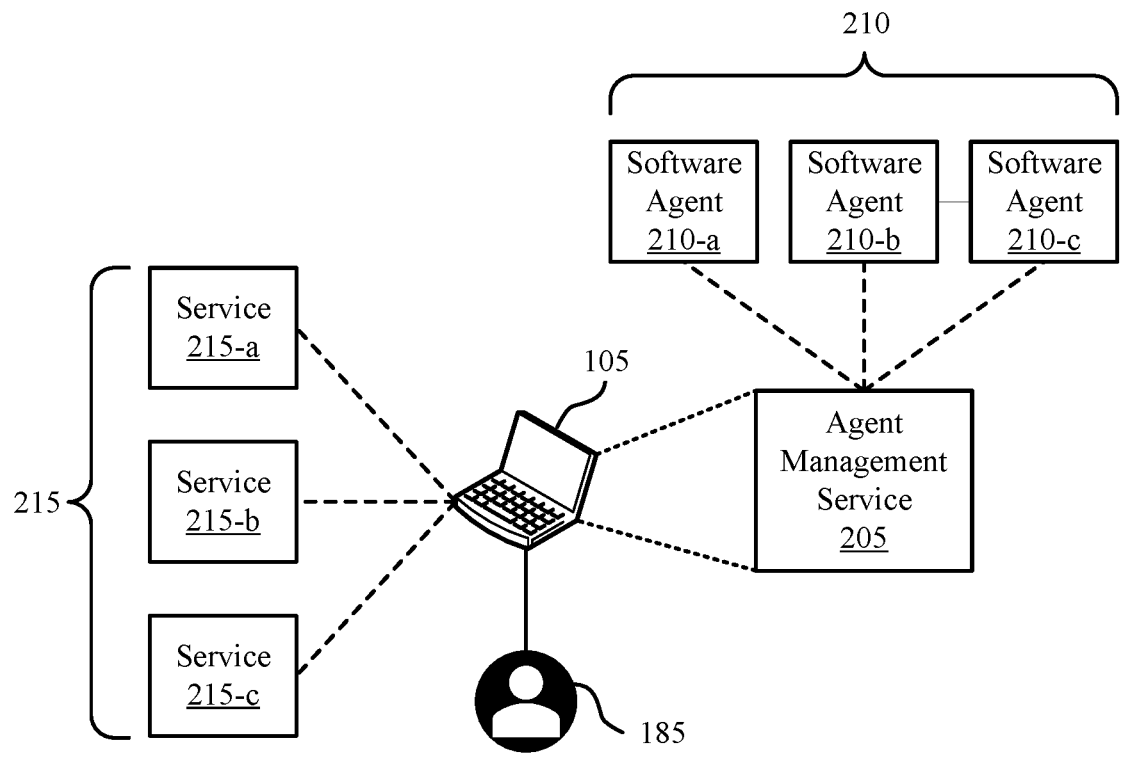

FIG. 2 shows an example of a computing system 200 that supports techniques for managing AI agents using UCAN tokens in accordance with aspects of the present disclosure. In some examples, the computing system 200 may be implemented by or may implement the computing system 100. For example, the computing system 200 may include a computing device 105 and a user 185 (e.g., a developer user 185), which may be examples of devices and services described with reference to FIG. 1. Further, the developer user 185 may use the computing device 105 to access an agent management service 205 that manages one or more software agents 210 (e.g., a software agent 210-*a*, a software agent 210-*b*, and a software agent 210-*c*) accessing one or more services 215 (e.g., a service 215-*a*, a service 215-*b*, and a service 215-*c*). The user 185 may be an example of a developer of a software agent 210, an end user of the service 215, or both.

Organizations and companies may use one or more AI services such as generative AI APIs or generative AI-enabled applications. Generative AI may be a form of AI that uses large language models (LLMs) to generate text, images, or other forms of media from natural language prompts. In some cases, generative AI models or generative pre-trained transformer (GPT) models may be pre-trained on relatively large sets of unlabeled text data and may be capable of identifying or generating content from text data. In some examples of the computing system 200, organizations and companies using the computing system 200 may manage one or more software agents 210 that use AI techniques, such as generative AI techniques, to perform tasks on behalf of users 185. Further, the one or more software agents 210 may also be referred to as agents or AI agents and it should be understood that the terms "agent" and "AI agent" refer to and are the same as the software agents 210 described elsewhere herein.

For example, a user 185 may have a software agent 210 (e.g., the software agent 210-*a*) that manages accounts of the user 185 with the service 215-*a*, the service 215-*b*, and the service 215-*c*. That is, the software agent 210-*a* may manage an account of the service 215-*a*, an account of the service 215-*b*, and an account of the service 215-*c*, where the accounts of the services 215 are associated with the user 185. To enable the software agent 210-*a* with the ability to access the accounts of the services 215 on behalf of the user 185, the user 185 may provide credential information associated with the accounts to the software agent 210-*a*. For example, the user 185 may provide the software agent 210-*a* with a username and password for an account of the service 215-*a*, an account of the service 215-*b*, and an account of the service 215-*c* such that the software agent 210-*a* can manage the accounts on the behalf of the user 185. However, providing such credential information to the software agent 210-*a* may expose sensitive data to the software agent 210-*a* and may risk unauthorized access to the accounts of the services 215 that the software agent 210-*a* is managing. Such exposure and unauthorized access may further compromise one or more security regulations of an organization or company, with which the user 185 belongs or is otherwise associated.

Moreover, providing user 185 credential information to software agents 210, configuring software agents 210 with unauthorized access to the services 215, or a combination thereof, may violate the principle of least privilege that describes that each module, device, or service within the computing system 200 should only be capable of accessing the data or information expected to effectively operate within the computing system 200. For example, if the software agent 210-*a* has access to the credentials of the user 185 for an account of a respective service 215, the software agent 210-*a* may have unlimited access to all the data associated with the user 185 within the respective service 215. Additionally, or alternatively, configuring the software agents 210 with user 185 credential information to enable the software agent 210 unauthorized access to a service 215 may make the computing system 200 unable to operate in accordance with a zero-trust security framework. A zero-trust security framework may expect that the users 185 (e.g., all users) attempting to gain access to resources of the computing system 200 be authorized before access is granted. However, the zero-trust framework may be unable to be maintained if the software agent 210 has access to the credentials of the user 185.

To prevent software agents 210 from having unauthorized access to user 185 credentials of one or more services 215 a user 185 may implement various techniques of the present disclosure to ensure that the software agents 210 are authorized to access the data that a respective software agent 210 is attempting to access. For example, one or more techniques of the present disclosure may enable the user 185 to configure a first software agent 210 (e.g., the software agent 210-*a*) with a set of parameters within one or more user interfaces of the agent management service 205. In some cases, the set of parameters may include an identifier of an API endpoint of a first service 215 (e.g., the service 215-*a*) that the software agent 210-*a* is authorized to query and one or more permissions associated with queries to the API endpoint by the software agent 210-*a*. Further, the user 185 may receive an authentication token for the software agent 210-*a* from the agent management service. The software agent 210-*a* may use the authentication token to access resources of the service 215-*a* via the API endpoint in accordance with the one or more permissions. Moreover, the user 185 may configure the software agent 210-*a* with the authentication token to enable the software agent 210-*a* to perform the queries to the API endpoint of the service 215-*a*. In some examples, the authentication token may be an example of a UCAN token that can be used for specific access and is configured with attenuated scopes or access in order to be delegated to autonomous software systems (e.g., AI systems) or software agents 210.

Therefore, using one or more techniques of the present disclosure, users 185 may be capable of configuring software agents 210 via the agent management service 205 to allow software agents 210 to query services 215 on behalf of the users 185 without exposing the credentials of the users 185 to the software agents 210. For example, the user 185 may generate an authentication token for a respective software agent 210 to authorize the respective software agent 210 the ability to access resources of respective services 215. Such authorization may be based on the user 185 selecting an API endpoint for a software agent 210 to query and configuring the software agent 210 with one or more permissions. Therefore, the software agent 210 may access the resources of a service 215 by querying the API endpoint of the service 215 in accordance with the one or more permissions. Further descriptions of users 185 using the agent management service 205 to configure and reconfigure software agents may be described elsewhere herein, such as with reference to FIGS. 3 through 5. In addition, descriptions of the user 185 configuring a software agent 210 within the one or more user interfaces of the agent management service 205 may be described elsewhere herein, such as with reference to FIGS. 6 through 9.

Figure 3:
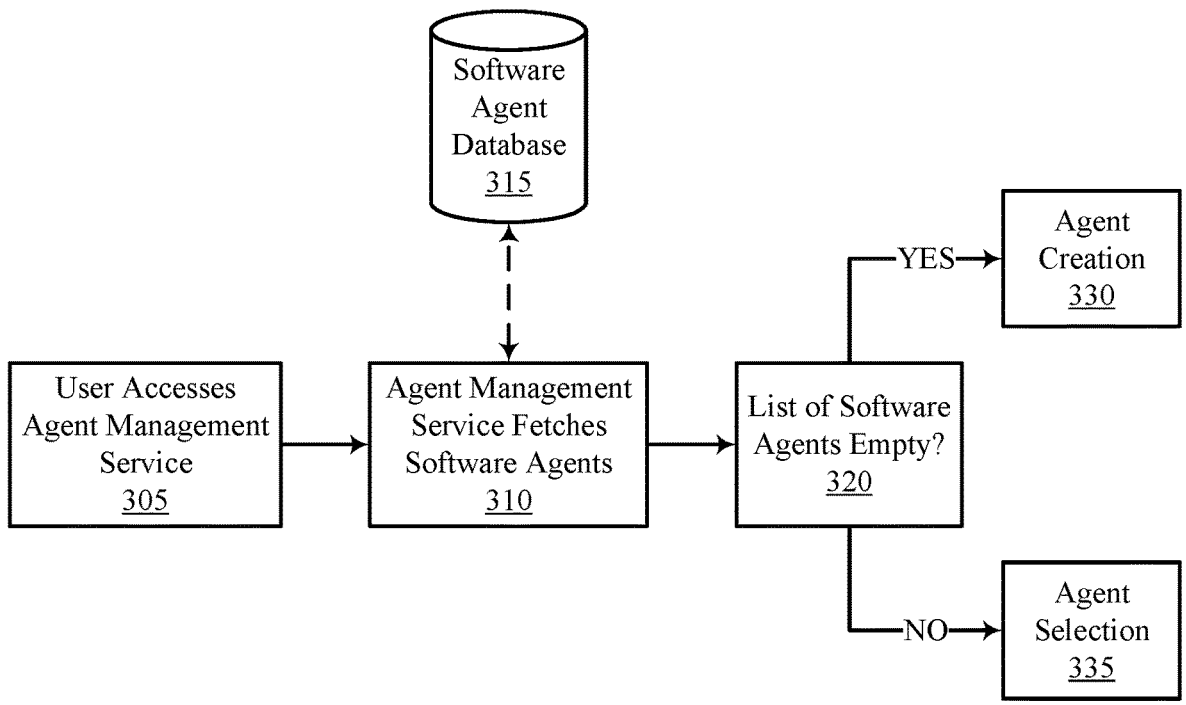
FIGS. 3 through 5 show examples of a flowchart that supports techniques for managing AI agents using UCAN tokens in accordance with aspects of the present disclosure.

FIG. 3 shows an example of a flowchart 300 that supports techniques for managing AI agents using UCAN tokens in accordance with aspects of the present disclosure. The operations of the flowchart 300 may be implemented by a computing device 105 or its components as described herein. For example, the operations of the flowchart 300 may be performed by a computing device 105 as described with reference to FIGS. 1 and 2. In some examples, a computing device 105 may execute a set of instructions to control the functional elements of the computing device 105 to perform the described functions. Additionally, or alternatively, the computing device 105 may perform aspects of the described functions using special-purpose hardware.

At 305, a user 185 may access a portal to view a list of software agents. In some examples, the portal may include or be otherwise associated with an agent management service (e.g., the agent management service 205 described with reference to FIG. 2). The agent management service may include a dashboard (e.g., a user interface) of an application, a dashboard of an identity management system (e.g., the identity management system 120 described with reference to FIG. 1), a standalone application, or any combination thereof. At 310, in response to the user 185 accessing the agent management service, the agent management service may fetch or query a software agent database 315 that stores the software agents configured by a user 185 of the identity management system. In some examples, the software agent database 315 may also be an example of a data store, a server, or any other type of computing resource used to store data within a computing system (e.g., the computing system 100, the computing system 200, or both).

In some cases, companies or organizations with one or more users 185 may use the agent management service and the software agent database 315 may store information related to the software agents configured by the one or more users 185 of the company or organization. For example, the software agent database 315 may store the configuration parameters of the software agents. In such cases, the software agents stored within the software agent database 315 may be associated with user identifiers (IDs), organization IDs, or both. Thus, at 310, the agent management service may determine which software agents within the software agent database 315 are associated with a user 185 based on the user ID, organization ID, or both for the user 185. For example, one or more software agents within the software agent database may be associated with an organization ID such that each user 185 of any organization has access to the respective one or more software agents. Further, one or more other software agents may be associated with user IDs or both user IDs and organization IDs such that a respective software agent is associated with a respective user 185 of an organization. Additionally, or alternatively, the agent management service may be used by one or more organizations and the software agent database 315 may store information associated with the software agents for the one or more organizations. In such cases, the software agent database 315 may be included within a multi-tenant database system.

At 320, the agent management service may determine whether a list of software agents associated with the user 185 is empty. That is, the agent management service may determine whether the software agent database 315 includes software agents associated with the user 185. In some examples, if the list of software agents associated with the user 185 is empty, the user 185 may initiate a software agent creation process at 330. The software agent creation process may be further described elsewhere herein, such as with reference to FIG. 4. In some other examples, if the list of software agents does include one or more software agents (e.g., there are one or more software agents associated with the user 185 stored in the software agent database 315), at 335, the user 185 may select a software agent from the list of software agents associated with the user 185. The process of a user 185 selecting a software agent from a list of software agents, at 335, may be described elsewhere herein, such as with reference to FIG. 5. Therefore, FIGS. 4 and 5 may describe the process of a user 185 configuring software agents within the agent management system, selecting a software agent from a list of configured software agents, reconfiguring a selected software agent, or any combination thereof in accordance with one or more techniques of the present disclosure.

Figure 4:
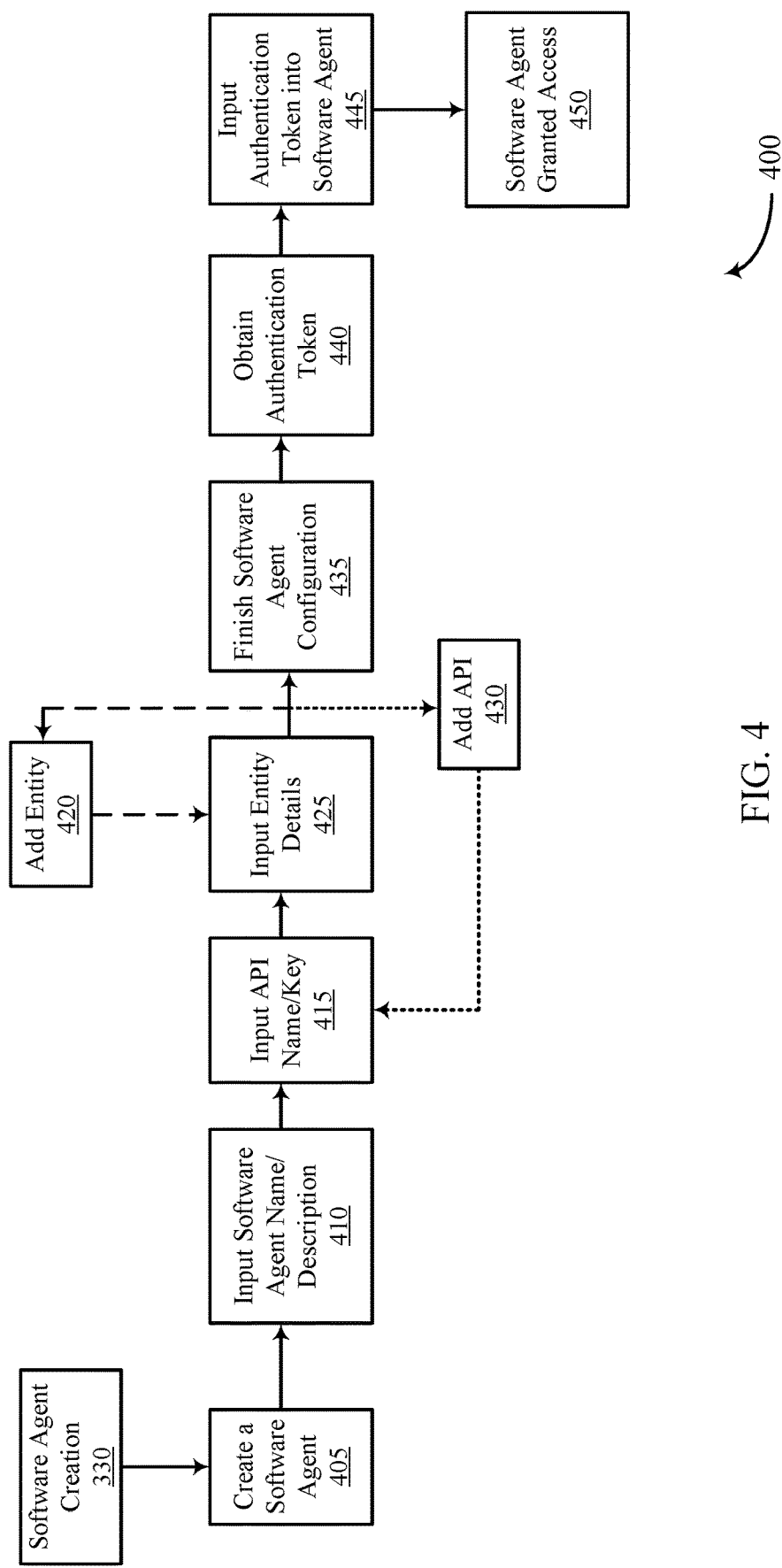

FIG. 4 shows an example of a flowchart 400 that supports techniques for managing AI agents using UCAN tokens in accordance with aspects of the present disclosure. The operations of the flowchart 400 may be implemented by a computing device 105 or its components as described herein. For example, the operations of the flowchart 400 may be performed by a computing device 105 as described with reference to FIGS. 1 and 2. In some examples, a computing device 105 may execute a set of instructions to control the functional elements of the computing device 105 to perform the described functions. Additionally, or alternatively, the computing device 105 may perform aspects of the described functions using special-purpose hardware.

In some examples, based on a software agent database (e.g., the software agent database 315 described with reference to FIG. 3) not including one or more software agents associated with a user 185, a user 185 may initiate a software agent creation procedure at 330. As part of the software agent creation procedure at 330, at 405, the user 185 may create a software agent within an agent management service (e.g., the agent management service 205 described with reference to FIG. 2). In some cases, at 405, the user 185 may select a button within a user interface of the agent management service to add a software agent. For example, as further described with reference to FIG. 9, the user 185 may select an "add agent" button within a user interface of the agent management service that displays the list of configured software agents (e.g., an empty list if no software agents associated with the user 185 are found within the software agent database 315).

At 410, to configure the software agent, the user 185 may input a name and description of the software agent. In some cases, the user 185 may input the name and description of the software agent within a first user interface of one or more user interfaces of the agent management service. Further description of the first user interface of the agent management service may be described elsewhere herein, such as with reference to FIG. 6. Further, at 415, the user 185 may input an API name and API key associated with a respective service (e.g., a service 215 described with reference to FIG. 2). In some cases, the user 185 may input the API name and API key within a second user interface of the one or more user interfaces of the agent management service which is further described elsewhere herein, such as with reference to FIG. 7. Moreover, the API name and API key may be associated with an API endpoint for a service accessible by the user 185. That is, the API endpoint of a service that a software agent may query is associated with the API name and API key that a user 185 inputs when configuring the software agent.

In addition, at 420, the user 185 may add an entity for the API and input details of the entity at 425. In some cases, the user 185 may add the entity and the details for the entity of a respective API within the same user interface or a different user interface than the second user interface that the user 185 inputs the name and key for a respective API. In some examples, the user 185 may add one or more entities and steps 420 and 425 may be repeated accordingly. Further descriptions of the user 185 adding one or more entities for a respective API within a respective user interface of the agent management service may be described elsewhere herein, such as with reference to FIG. 7. Additionally, or alternatively, at 430, the user 185 may select to add an additional API, thus repeating 415 through 425 accordingly.

At 435, the user 185 may select to finish or complete the software agent configuration. For example, a user 185 may select a "finish" or "complete" button within a respective user interface of the agent management service. In some cases, the respective user interface may be the same as the second user interface that the user 185 inputs a name and key for a respective API, one or more entities associated with the respective API, or both, or a separate user interface. Further descriptions of the user 185 finishing or completing the software agent configuration within a respective user interface of the agent management service may be described elsewhere herein, such as with reference to FIG. 7.

Thus, at 440, based on the user 185 completing the software agent configuration at 425, the user 185 may receive or obtain an authentication token for the software agent. In some cases, the user 185 may receiver a client ID and a secret token for the software agent within a third user interface of the agent management service that is described with reference to FIG. 9. Further, the authentication token may be generated based on the client ID and the secret token of the software agent. Moreover, as described elsewhere herein, the authentication token may enable the software agent to access resources of a respective service via an API endpoint (e.g., the API endpoint associated with the API name and API key inputted at 415). Further, the authentication token may authorize the software agent to access the resources of the respective service on behalf of the user 185 in accordance with the permissions of the software agent configured by the user 185. In some examples, in accordance with one or more techniques of the present disclosure, the authentication token may be an example of a UCAN token. A UCAN token may be an extension of a JavaScript object notation (JSON) web token (JWT) format such that the user 185 (e.g., a developer user 185) is capable of transmitting or sending the UCAN token in a bearer header of a hypertext transfer protocol (HTTP) request similar to as if transmitting or sending a JWT token. In some examples, UCAN tokens may support authentication and authorization procedures to define what resources the token has access to. Additionally, or alternatively, the UCAN token may be delegated to a third-party while still maintaining secure access.

Therefore, a software agent may be capable of providing an authentication token to an authentication server to authenticate the software agent for access to the data associated with a user 185 based on the permissions configured by a user 185. Further, the authentication token may enable the user 185 to allow a third-party (e.g., a software agent) to access resources accessible by the user 185 without configuring the third-party with the credentials of the user 185. In some examples, to identify a user 185 and service, the authentication token may include decentralized identifiers (DIDs) within a first field of a payload portion of the authentication token (e.g., an audience field of a UCAN token). Further, the DIDs may be represented via one of a set of forms such as public and private key pairs, JSON keys, API endpoints, or any combination thereof. Additionally, or alternatively, the DIDs may use one or more cryptographic proofs to ensure validity and for authentication purposes. Moreover, in some examples, the authentication token may include a second field within the payload portion of the authentication token (e.g., an attenuation field of a UCAN token) that indicates a list of resources, capabilities, and permissions that the authentication token can grant a software agent.

Therefore, the payload portion of the authentication token may include the first field to indicate the recipient of the authentication token (e.g., the API endpoint of a first service) and the second field to indicate the capabilities the authentication token grants (e.g., the one or more permissions associated with queries to the API endpoint by a software agent). In addition, the authentication token may include a header and a signature portion. The header of the authentication token (e.g., header of a UCAN token) may include a first field (e.g., an algorithm field) to indicate a type of signature, a second field (e.g., a type field) to indicate a type of data structure of the authentication token (e.g., a JWT data structure), and a third field (e.g., a version field) to indicate a version of the authentication token (e.g., a UCAN version). Further, the signature portion of the authentication token may include a signature in accordance with the type of signature indicated within the first field of the header of the authentication token. Moreover, in accordance with one or more techniques of the present disclosure, a portion of the payload of the authentication token may include the API endpoint of a first service and the signature of the authentication token may include a private key.

Further, to obtain the authentication token, at 440, once a user 185 configures a software agent, the user 185 may receive the authentication token by querying an authorization endpoint (e.g., /auth0/ucan/token) which returns the authentication token. Thus, once a user 185 receives the authentication token, the authentication token may be usable by a first software agent based on the portion of the payload that includes the API endpoint being associated with the signature of the authentication token. Therefore, at 445, the user 185 may input or configure the software agent with the authentication token. In some cases, configuring the software agent with the authentication token may include attaching the authentication token to the software agent. Thus, at 450, the user 185 may grant the software agent access to a service based on the user 185 configuring the software agent with the authentication token. Therefore, the user 185 may configure the software agent with the authentication token to enable the software agent to perform one or more queries to the API endpoint of a service. That is, the software agent may query the desired API that the authentication token has access to.

The owner or issuer of the authentication token may be shown in the parent hierarchy (e.g., the user 185 that the software agent belongs to). That is, while the agent management service may generate the authentication token for use by a third-party (e.g., the software agent), the owner or issuer of the authentication token may determine which user the software agent (and thus the authentication token) belongs to. Additionally, or alternatively, the receiver of the token (e.g., a service associated with the API endpoint that the software agent is configured with) may verify the authentication token by creating an authentication application that is capable of accepting the authentication token (e.g., UCAN tokens). Further, in some cases, the authentication application may validate the authentication token and the issuer of the authentication token by accessing an authentication server. One or more techniques of the present disclosure may enable an end-to-end authentication managed system for users 185 that use and accept software agents to query API endpoints of services.

Further, configuring the software agent with the authentication token (e.g., a UCAN token) in accordance with one or more techniques of the present disclosure may enable the software agent to access resources of a service via an API endpoint of the service on behalf of the user 185 in accordance with one or more permissions configured for the software agent. For example, by using the UCAN token, the user 185 may grant the software agent access to one or more resources (e.g., specific resources) of a service via an API endpoint of the service in accordance with the permissions set for the software agent.

The software agent may be unable to access other resources within the service (e.g., resources other than the one or more resources the software agent may access using the authentication token) as the software agent lacks the information to access other resources. For example, if a user 185 configures a software agent with the credentials of the user 185 to access a service, the user 185 may lack a mechanism for constraining the software agent's access to resources (e.g., any resource) within the service that the user 185 has access to. By configuring the software agent with the authentication token, the user 185 may constrain the software agent's access to resources of a service via configured permissions. Additionally, or alternatively, refraining from configuring software agents with the credentials of users 185 may increase the security of a computing system. For example, by using the authentication tokens, users 185 may be capable of ensuring that software agents have access (e.g., only have access) to particular resources in accordance with permissions set by the users 185. Further, as described elsewhere herein, such as with reference to FIG. 5, users 185 may be capable of modifying (e.g., refining, changing, reconfiguring) software agents within the agent management system to dynamically update the capabilities of one or more software agents.

Figure 5:
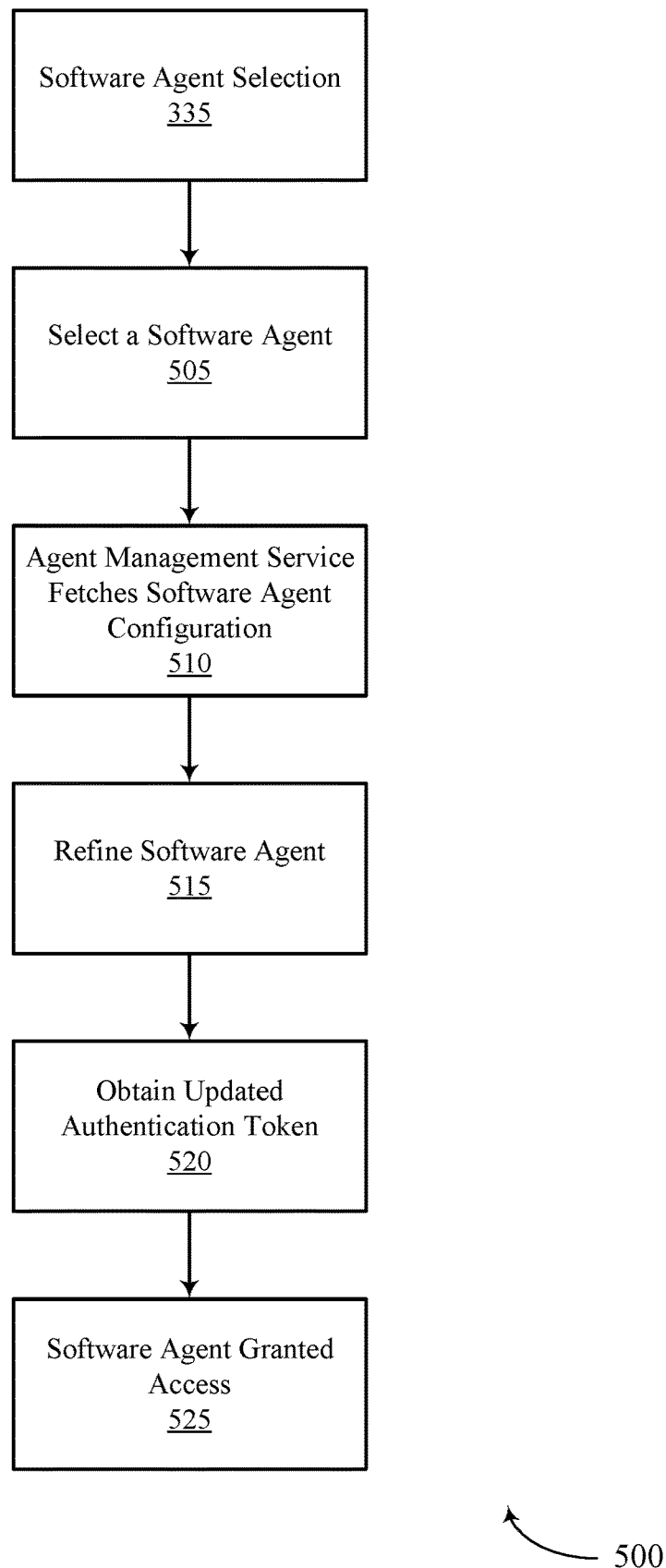

FIG. 5 shows an example of a flowchart 500 that supports techniques for managing AI agents using UCAN tokens in accordance with aspects of the present disclosure. The operations of the flowchart 500 may be implemented by a computing device 105 or its components as described herein. For example, the operations of the flowchart 500 may be performed by a computing device 105 as described with reference to FIGS. 1 and 2. In some examples, a computing device 105 may execute a set of instructions to control the functional elements of the computing device 105 to perform the described functions. Additionally, or alternatively, the computing device 105 may perform aspects of the described functions using special-purpose hardware.

In some examples, based on a software agent database (e.g., the software agent database 315 described with reference to FIG. 3) that stores one or more software agents associated with a user 185, a user 185 may initiate a software agent selection procedure at 330. At 505, a user 185 may select a software agent from a list of software agents. In some cases, the agent management service (e.g., the agent management service 205 described with reference to FIG. 2) may display a list of software agents via a user interface of the agent management service. Further, the list of software agents displayed within a user interface of the agent management system may include one or more software agents such that, at 505, the user selects a first software agent from one or more software agents displayed within the user interface.

At 510, the agent management system may fetch the configuration of the first software agent and display the configuration within the same user interface or a different user interface of the agent management system. For example, the agent management system may display the configuration of the first software agent within a user interface that is overlayed on top of or on the side of the user interface that displays the list of software agents or the selection of the first software agent may trigger the display of a different user interface to display the configuration of the first software agent.

At 515, the user 185 may refine or reconfigure the first software agent within a user interface of the agent management service. In some cases, reconfiguring the first software agent may include updating an identifier of the API endpoint of a first service and the one or more permissions associated with queries to the API endpoint by the first software agent. For example, a user 185 may reconfigure the first software agent to query a different API endpoint, or the user may change the permissions associated with the queries (e.g., adding or removing permissions). In some other cases, reconfiguring the first software agent may include the user 185 adding an identifier of a second API endpoint of a second service that the first software agent is authorized to query to the configuration of the first software agent and the user 185 adding the one or more permissions associated with the queries to the second API endpoint by the first software agent. Further, reconfiguring the first software agent may include updating, adding, or removing one or more parameters of the first software agent. For example, the user 185 may reconfigure the first software agent with a different name, to query additional API endpoints and additional services, to adjust the permissions of the first software agent to query the respective API endpoints, or any combination thereof.

Thus, at 520, the user 185 may receive an updated authentication token for the first software agent from the agent management service based on the reconfiguration at 515. Therefore, at 525, the user 185 may configure the first software agent with the updated authentication token to grant the first software application access to the resources of the first service, the second service, or both. As such, the first software agent may be capable of performing the queries to the API endpoint of the first service, the API endpoint of the second service, or both. Therefore, in accordance with one or more techniques of the present disclosure, users 185 may refine or reconfigure software agents by selecting software agents to be reconfigured. Further descriptions of the user interfaces of the agent management service that a user may use to configure or reconfigure software agents may be described elsewhere herein, such as with reference to FIGS. 6 through 9.

FIG. 6 shows an example of a user interface 600 that supports techniques for managing AI agents using UCAN tokens in accordance with aspects of the present disclosure. In some examples, the user interface 600 may be implemented by or may implement the computing system 100, the computing system 200, or both. In some examples, the operations of the user interface 600 may be implemented by a user 185 of a computing device 105 or its components as described herein. For example, the operations of the user interface 600 may be performed by a computing device 105 as described with reference to FIGS. 1 and 2. In some examples, a computing device 105 may execute a set of instructions to control the functional elements of the computing device 105 to perform the described functions of the user interface 600. Additionally, or alternatively, the computing device 105 may perform aspects of the user interface 600 using special-purpose hardware.

In some cases, the user interface 600 may be an example of a user interface of the interface 190 described with reference to FIG. 1. For example, the user interface 600 may be a user interface of an agent management service (e.g., the agent management service 205 described with reference to FIG. 2). In some cases, the agent management service may be an example of a dashboard or an application (e.g., an application 110 described with reference to FIG. 1) accessible via the interface 190. Further, the user interface 600 may be used by one or more users to generate a software agent within the agent management service. In some examples, the users 185 may be information technology (IT) administrators. The IT administrators may configure the software agents for consumption by users 185 that are employees or members of a company or organization such that the employees can make use of AI and ML products. In some other examples, the users 185 using the interface 600 to configure a software agent may be employee end users that use and leverage software agents. Further, such users 185 may use one or more techniques of the present disclosure to customize software agents and adjust the permissions of software agents to protect private or confidential information.

Therefore, users 185 (e.g., IT admin and employee end users) may use the user interface 600 to configure a software agent within the agent management service. As illustrated, user interface 600 may include one or more fields (e.g., a software agent name field 605 and a software agent description field 610) to configure the software agent with a set of parameters. Therefore, users 185 may input a name for a respective software agent to be used to identify the software agent within a list of software agents within the software agent name field 605. For example, a software agent that a user 185 may use to assist with planning travel itineraries may be named a 'Travel Agent.' Further, the user interface 600 may input a description of the software agent within the software agent description field 610. For example, when the software agent is a software agent used for travel plans, the user 185 may input a line of text that states, "a software agent for travel planning and booking." Additionally, or alternatively, the software agent name field 605 and the software agent description field 610 may be restricted by a set of characters or words. For example, the software agent name field 605 used to input a name of a software agent may be constrained to a particular quantity of characters (e.g., have a 40-character maximum).

Therefore, after inputting text into the software agent name field 605 to provide a name for a software agent and inputting text into the software agent description field 610 to provide a description of the software agent, the user 185 may select a continue button to continue the process of configuring a software agent. Additionally, or alternatively, if the user 185 wishes to not continue with the process of configuring the software agent, the user 185 may select a cancel button to end the software agent configuration process. Further descriptions of when the user 185 selects the continue button to continue the configuration of a software agent may be described elsewhere herein, such as with reference to FIGS. 7 through 9.

FIG. 7 shows an example of a user interface 700 that supports techniques for managing AI agents using UCAN tokens in accordance with aspects of the present disclosure. In some examples, the user interface 700 may be implemented by or may implement the computing system 100, the computing system 200, or both. In some examples, the operations of the user interface 700 may be implemented by a user 185 of a computing device 105 or its components as described herein. For example, the operations of the user interface 700 may be performed by a computing device 105 as described with reference to FIGS. 1 and 2. In some examples, a computing device 105 may execute a set of instructions to control the functional elements of the computing device 105 to perform the described functions of the user interface 700. Additionally, or alternatively, the computing device 105 may perform aspects of the user interface 700 using special-purpose hardware.

In some examples, users 185 may access the user interface 700 based on the selection of a continue button within a previous user interface (e.g., the user interface 600 described with reference to FIG. 6) designed for users to input and describe a software agent that a user is configuring. In some cases, the user interface 700 may include one or more portions such as an API portion 705 and an API entity portion 710. In some examples, the API portion 705 may include an API name field 715 and an API key field 720. Thus, a user 185 may use the API name field 715 to input the name of an API for the software agent to query or have access to. Further, the user 185 may input an API key within the API key field 720 for the software agent to interact with. For example, as described herein, if the software agent is a travel agent, a user 185 may configure the software agent to have access to a group-based communication system such that software agent can query the group-based communication system for messages related to travel plans.

Moreover, the user 185 may configure the software agent with an entity of an API (e.g., the API listed within the API portion 705 of the user interface 700) within the API entity portion 710 of the user interface 700. Within the API entity portion 710 of the user interface 700, the user 185 may input a name of an entity within an API entity name field 725 and configure the one or more permissions of the software agent via permission checkboxes 730. Therefore, the user 185 may input the name of the entity for the API key inputted in the API key field 720 within the API entity name field 725. In some cases, to determine the name of the API entity to be used, a user 185 may refer to the documentation of an API. Further, the user 185 may configure the software agent with one or more permissions via the permissions checkboxes 730 to determine the permissions that the software agent has when accessing the entity of the API indicated within the API portion 705 and the API entity portion 710 of the user interface 700. For example, a user 185 may select a first permission checkbox of the permission checkboxes 730 to indicate that the software agent has access to create objects when accessing the entity of the respective API indicated within the user interface 700. Further, the user 185 may select a second permission check box of the permission checkboxes 730 and a third permission checkbox of the permission checkboxes 730 to indicate that the software agent has access to update and read objects of the entity of the respective API indicated within the user interface 700. Additionally, or alternatively, the user 185 may refrain from selecting a fourth permission checkbox of the permission checkboxes 730 to indicate that the software agent is unable to delete objects of the entity of the respective API indicated within the user interface 700.

Therefore, in the example of the user 185 using a software agent for travel assistance and the API being for a group-based communication system, the API name field 715 may include the name of the group-based communication system and the API key field 720 may include an API key for the software agent to use to query the group-based communication system. Further, the API entity name field 725 may include a name of a communication channel within the group-based communication system that is used to discuss travel plans. Thus, based on the selected permissions checkboxes 730, the software agent may be capable of creating messages (e.g., writing messages), updating messages, and reading messages within the respective channel of the group-based communication system.

Further, in some cases, a user 185 may configure a software agent with one or more API entities for the software agent to query, one or more API endpoints for the software agent to query, or both. For example, the user 185 may select an add entity button 735 to add additional entities of the API indicated within the API portion 705 of the user interface 700. Therefore, the user interface 700 may display a second entity portion 710. In some examples, a user 185 may select an add API button 740 to authorize the software agent the capability to query an additional API. Thus, in some cases, the user interface 700 may display a second API portion 705 and a second API entity portion 710. Additionally, or alternatively, selection of the add API button 740 may trigger the display of a separate user interface to the user 185. Therefore, the user 185 may be capable of configuring the software agent with the authorization of accessing one or more API endpoints of one or more services.

For example, if the software agent is a travel agent, the user 185 may configure the software agent the capability of querying a channel of a group-based communication system, a calendar management system, and a travel website. For example, based on having access to the resources of such APIs, the software agent may be capable of detecting when a user 185 within the channel of the group-based communication system indicates a desire to travel to a location for a duration (e.g., a week). The software agent may then access the calendar management system of the respective user to block the duration in a calendar associated with the user 185. Further, the software agent may query the travel website using the information provided by the user (e.g., the location and duration) to output a set of quotes to the user 185. In some cases, the set of quotes may include information such as flight costs, hotel costs, rental car costs, or any combination thereof. Additionally, or alternatively, if the user 185 configures the software agent with write or create permissions for the API endpoint of the group-based communication system, the software agent may transmit (e.g., send) a message that lists the set of quotes to the user 185 that is displayed within the respective channel of the group-based communication system. In some cases, the message may be a reply to the previous message (e.g., the message from the user with the indication to travel) or the message may be a separate message.

Thus, to enable such messaging and assistance, a user 185 may configure the software agent with one or more API endpoints and a set of permissions for accessing the one or more API endpoints via the user interface 700. In some examples, the user interface 700 may also include a continue button, a back button, and a cancel button. Selection of the continue button may save the details inputted by the user 185 within the API portion 705 and the API entity portion 710 of the user interface 700 and display the next user interface for configuring the software agent. Selection of the back button may save the details inputted by the user within the API portion 705 and the API entity portion 710 of the user interface 700 and display the previous user interface used for configuring the software agent (e.g., the user interface 600 described with reference to FIG. 6). Further, selection of the cancel button may refrain from saving the details inputted by the user 185 within the API portion 705 and the API entity portion 710 of the user interface 700 and cancel the configuration of the software agent. Further descriptions of configuring software agents within an agent management system may be described elsewhere herein, such as with reference to FIGS. 8 and 9.

Figure 8:
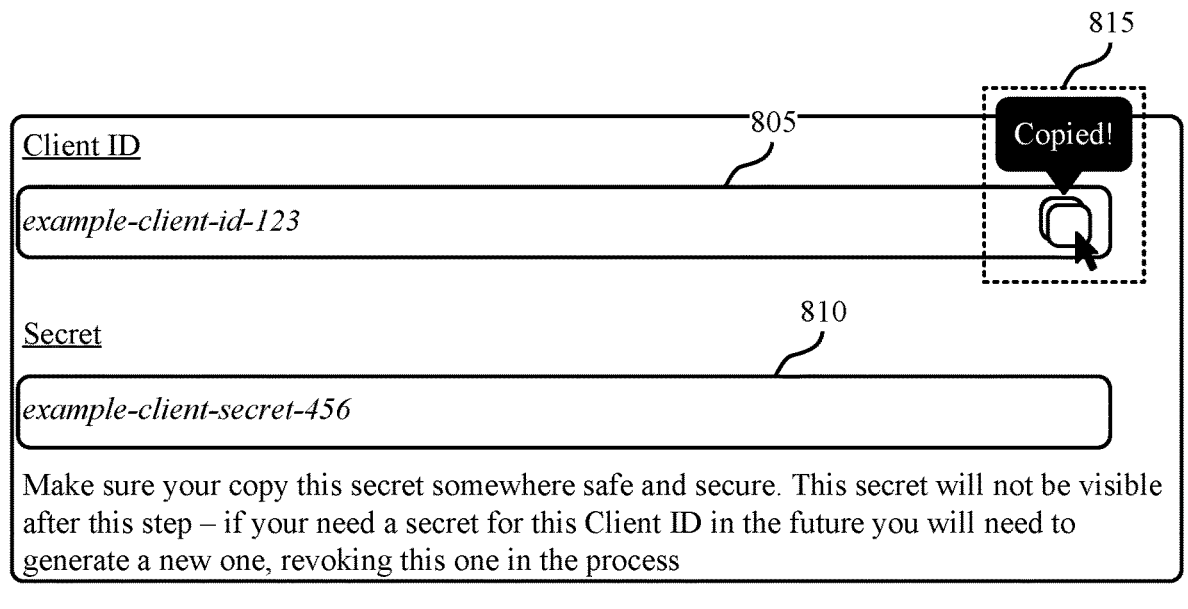

FIG. 8 shows an example of a user interface 800 that supports techniques for managing AI agents using UCAN tokens in accordance with aspects of the present disclosure. In some examples, the user interface 800 may be implemented by or may implement the computing system 100, the computing system 200, or both. In some examples, the operations of the user interface 800 may be implemented by a user 185 of a computing device 105 or its components as described herein. For example, the operations of the user interface 800 may be performed by a computing device 105 as described with reference to FIGS. 1 and 2. In some examples, a computing device 105 may execute a set of instructions to control the functional elements of the computing device 105 to perform the described functions of the user interface 800. Additionally, or alternatively, the computing device 105 may perform aspects of the user interface 800 using special-purpose hardware.

In some examples, users 185 may access the user interface 800 via selection of a continue button within a previous user interface (e.g., the user interface 700 described with reference to FIG. 7) designed for users 185 to input one or more API endpoints and permissions for the software agent when querying and accessing the resources of the service associated with a respective API endpoint. The user interface 800 may include a client ID field 805 that displays a client ID and a secret field 810 that displays a secret token that is associated with the client ID. In some examples, the secret token may be an example of a key or token used to access sensitive or confidential information or data. In the user interface 800, the secret may be displayed (e.g., may only be displayed) within the user interface 800 during the configuration of the software agent. Therefore, if a user 185 forgets the secret that is displayed within the secret field 810, the current client ID and secret token will be revoked, and an additional client ID and secret may be generated. Therefore, the client ID field 805 may also include a copy button 815 for the user 185 to copy the client ID displayed within the client ID field 805 to a clipboard of a computing device 105. Further, the authentication token described elsewhere herein may be generated based on the client ID and the secret token displayed within the user interface 800.

In some cases, client ID and the secret token displayed within the user interface 800 may be used by the software agent to determine which user to act on behalf of. For example, a software agent may be used by one or more users 185 and the client ID and secret token may authorize the software agent to act on the behalf of a respective user 185. Additionally, or alternatively, the client ID (e.g., an identifier associated with the user 185) and secret token (e.g., a random string of characters, such as letters or numbers) may be used to enable the software agent the capability to query a respective API endpoint of a service on the behalf of a user 185 without the credentials of the user for the respective service.

Further, the user interface 800 may include a finish button to close out of the user interface 800 and complete the configuration of the respective software agent within an agent management service. In some cases, based on the completion of the configuration of a software agent, the agent management service may display a list of configured software agents associated with the user. Further descriptions of the user interface that displays the list of configured software agents may be described elsewhere herein, such as with reference to FIG. 9.

Figure 9:
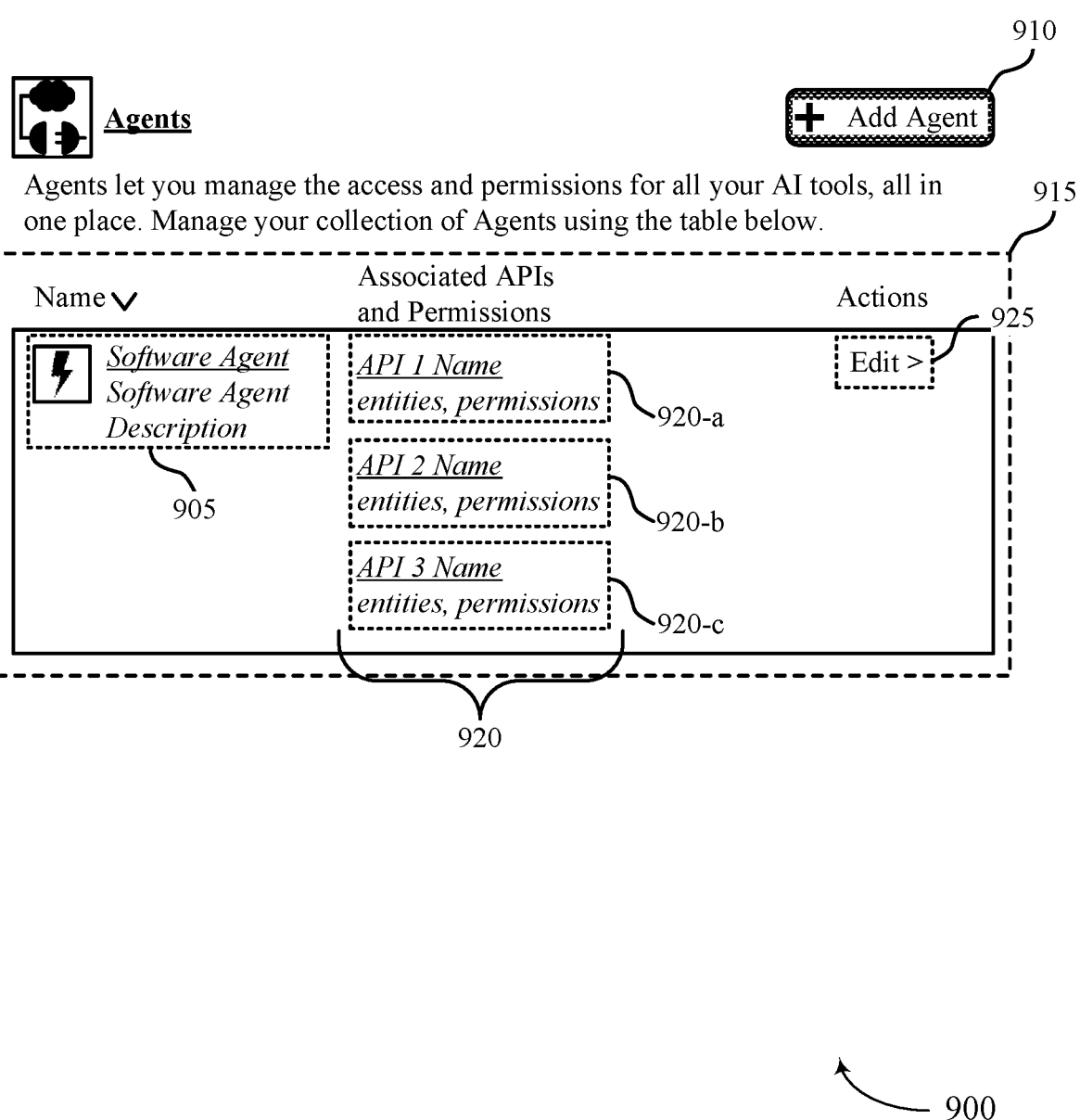

FIG. 9 shows an example of a user interface 900 that supports techniques for managing AI agents using UCAN tokens in accordance with aspects of the present disclosure. In some examples, the user interface 900 may be implemented by or may implement the computing system 100, the computing system 200, or both. In some examples, the operations of the user interface 900 may be implemented by a user 185 of a computing device 105 or its components as described herein. For example, the operations of the user interface 900 may be performed by a computing device 105 as described with reference to FIGS. 1 and 2. In some examples, a computing device 105 may execute a set of instructions to control the functional elements of the computing device 105 to perform the described functions of the user interface 900. Additionally, or alternatively, the computing device 105 may perform aspects of the user interface 900 using special-purpose hardware.

In some examples, as described herein, the user interface 900 may display a list of configured software agents 905 associated with a user 185 of an agent management system. Further, the user interface 900 may be an example of a user interface or dashboard of the agent management system. Moreover, in some cases, users 185 may initiate the configuration of a software agent 905 within the user interface 900 by selecting an add agent button 910. Therefore, the user 185 may trigger the display of one or more user interfaces for configuring the software agent 905 (e.g., the user interface 600, the user interface 700, and the user interface 800 described with reference to FIGS. 6 through 8 respectively). Once configured, the software agent 905 may be displayed within a list of configured software agents 905 within the user interface 900. For example, the user interface 900 may include a table 915 that includes the list of software agents 905.

In some examples, the table 915 may include one or more entries associated with one or more software agents. For example, as illustrated in FIG. 9, the table 915 may have an entry for a first software agent 905, however, it should be understood that the table 915 may include more than one entries associated with one or more software agents 905. Therefore, the table 915 displayed within the user interface 900 may include an entry for each software agent 905 configured by a user within the agent management system. Additionally, or alternatively, the table 915 may be empty indicating a lack of software agents 905 within the agent management system associated with the user 185. Therefore, a user 185 may select the add agent button 910 to configure a software agent 905 within the agent management system.

Further, in some cases, the table 915 may include a set of columns to display the attributes of a respective software agent 905. For example, the table 915 may include a name column, and associated APIs and permissions column, an actions column, or any combination thereof. In some examples, the table 915 may be sorted by the name of the respective software agents 905 listed within the name column of the table 915. For example, a user 185 may sort the table 915 such that user interface 900 displays the list of software agents 905 in alphabetical order (e.g., from A-Z or from Z-A) or in chronological order based on the date the user 185 configured the respective software agents 905 (e.g., starting from most recent configured software agent 905 or starting from the first configured software agent 905).

The associated APIs and permissions column may of the table 915 may indicate one or more APIs 920 (e.g., an API 920-*a*, an API 920-*b*, an API 920-*c*, or any combination thereof) that a respective software agent 905 is authorized to access or query. Further, the table 915 may also display the entities of a respective API 920 that the software agent 905 has access to and the one or more permissions that the software agent 905 may query the respective API 920 in accordance with. For example, the API 920-*a* may be a group-based communication system and the user interface 900 may display within the table 915 that the software agent 905 has access to a respective channel of the group-based communication system in accordance with one or more permissions displayed within the table 915 of the user interface 900.

Moreover, a user 185 may be capable of editing or adjusting a respective software agent 905 within the user interface 900 via an edit field 925 associated with the respective software agent 905. In some cases, when a user 185 selects the edit field 925, a user interface may be displayed to the user as an overlay within the user interface 900. Therefore, the user 185 may be capable of editing or adjusting the software agent 905 within user interface 900. In some other cases, when a user 185 selects the edit field 925, the agent management system may display a separate user interface for the user 185 to reconfigure the software agent 905. Therefore, in some examples, a user 185 may reconfigure a software agent 905 via the user interface 900 based on selecting the software agent 905. Further, the user 185 may receive an updated authentication token for the software agent 905 based on the reconfiguration of the software agent 905. In some cases, reconfiguring the software agent 905 may include updating an identifier of the API endpoint for an API 920 of a respective service and updating the one or more permissions associated with queries to the API endpoint. Additionally, or alternatively, the reconfiguration may include adding an API 920 and a respective API endpoint of a respective service that the software agent 905 is authorized to query, removing one or more parameters of the software agent 905, or a combination thereof.

Therefore, using the user interface 900, users 185 may be capable of managing the software agents 905 within the agent management system in accordance with one or more techniques of the present disclosure. For example, a user 185 may configure additional software agents 905 and adjust or reconfigure existing software agents 905 within the user interface 900.

Figure 10:
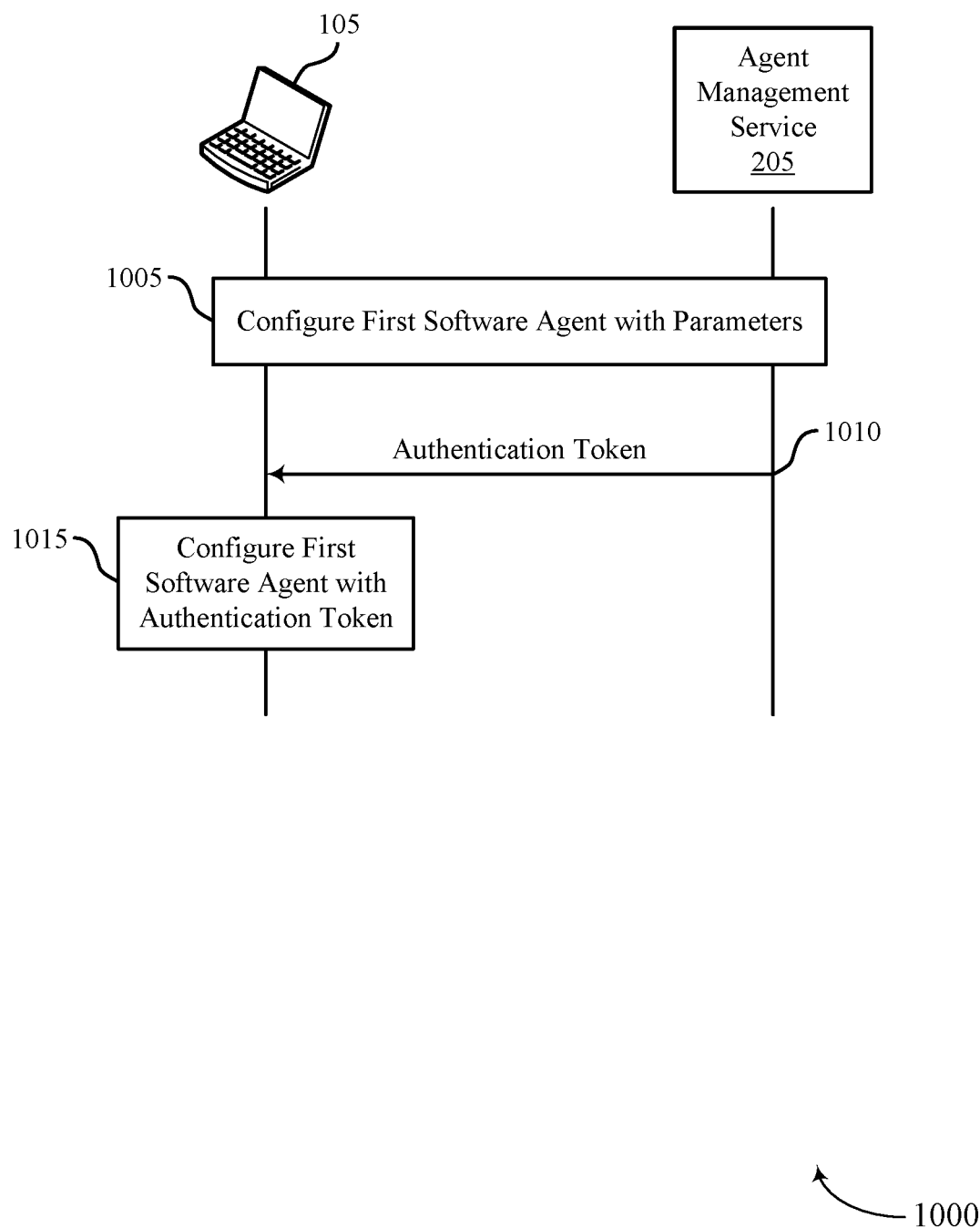
FIG. 10 shows an example of a process flow that supports techniques for managing AI agents using UCAN tokens in accordance with aspects of the present disclosure.

FIG. 10 shows an example of a process flow 1000 that supports techniques for managing AI agents using UCAN tokens in accordance with aspects of the present disclosure. In some examples, the process flow 1000 may be implemented by or may implement the computing system 100, the computing system 200, the user interface 600, the user interface 700, the user interface 800, the user interface 900, or any combination thereof. For example, the process flow 1000 may include a computing device 105 and an agent management service 205 which may be examples of devices or services described elsewhere herein with reference to FIGS. 1 and 2

In the following description of the process flow 1000, the operations between the computing device 105 and the agent management service 205 may be performed in different orders or at different times. Some operations may also be left out of the process flow 1000, or other operations may be added. Although the computing device 105 and the agent management service 205 are shown performing the operations of the process flow 1000, some aspects of some operations may also be performed by one or more other devices, services, or models described elsewhere herein including with reference to FIG. 1.

At 1005, a user 185 of the computing device 105 may configure, within one or more user interfaces of an agent management service 205, a first software agent with a set of parameters may occur. The set of parameters may include at least an identifier of an API endpoint of a first service that the first software agent is authorized to query, and one or more permissions associated with queries to the API endpoint by the first software agent. In some examples, the one or more permissions may include read permissions, write permissions, creation permissions, deletion permissions, or any combination thereof. Further, in some cases, the first software agent may perform the queries to the API endpoint of the first service on behalf of a first user of a set of users. Moreover, the first service may include a native application or a web-based application. Additionally, or alternatively, agent management service 205 may include an application, a dashboard of an application, a user interface of an application, or any combination thereof. Further, in some cases, the user 185 of the computing device 105 may select, within a first user interface of the one or more user interfaces of the agent management service 205, to generate the first software agent. Thus, the first software agent may be configured within the first user interface of the agent management service 205 based on the selection within the first user interface of the agent management service 205.

At 1010, the user 185 of the computing device 105 may receive, from the agent management service 205, an authentication token for the first software agent. The authentication token may be usable by the first software agent for accessing resources of the first service via the API endpoint in accordance with the one or more permissions. In some examples, receiving the authentication token for the first software agent may include receiving, from the agent management service 205, a header, a payload, and a signature of the authentication token. A portion of the payload of the authentication token may include the API endpoint of the first service and the signature of the authentication token may include a private key. Thus, the authentication token may be usable by the first software agent for accessing the resources of the first service via the API endpoint of the first service based on the portion of the payload including the API endpoint of the first service being associated with the signature of the authentication token.

At 1015, the user 185 of the computing device 105 may configure the first software agent with the authentication token to enable the first software agent to perform the queries to the API endpoint of the first service. In some examples, configuring the first software agent via the agent management service 205 may include inputting, within a first user interface of the one or more user interfaces of the agent management service 205, an identifier for the first software agent. Configuring the first software agent may also include inputting, within a second user interface of the one or more user interfaces of the agent management service 205, an identifier of the first service, the API endpoint of the first service, the one or more permissions associated with the queries to the API endpoint by the first software agent, or any combination thereof. Further, the user 185 of the client device may receive, via a third user interface of the one or more user interfaces of the agent management service 205, an indication of a client identifier and a secret token for the first software agent. Additionally, or alternatively, the authentication token may be generated based on the client ID and the secret token of the first software agent.

Moreover, in some examples, the user 185 of the computing device 105 may select, within a first user interface of the one or more user interfaces of the agent management service 205, the first software agent from one or more software agents displayed within the first user interface. Therefore, the user 185 of the computing device 105 may reconfigure the first software agent within a second user interface of the agent management service 205 based on selecting the first software agent from the one or more software agents. Thus, the user 185 of the computing device 105 may receive, from the agent management service 205, an updated authentication token for the first software agent based on the reconfiguration of the first software agent. Further, the first software agent may be configured with the updated authentication token to perform the queries to the API endpoint of the first service. In some cases, reconfiguring the first software agent may include updating the identifier of the API endpoint of the first service and the one or more permissions associated with the queries to the API endpoint by the first software agent, adding another identifier of a second API endpoint of a second service that the first software agent is authorized to query and one or more permissions associated with queries to the second API endpoint by the first software agent, removing one or more parameters of the first software agent, or any combination thereof.

Figure 11:
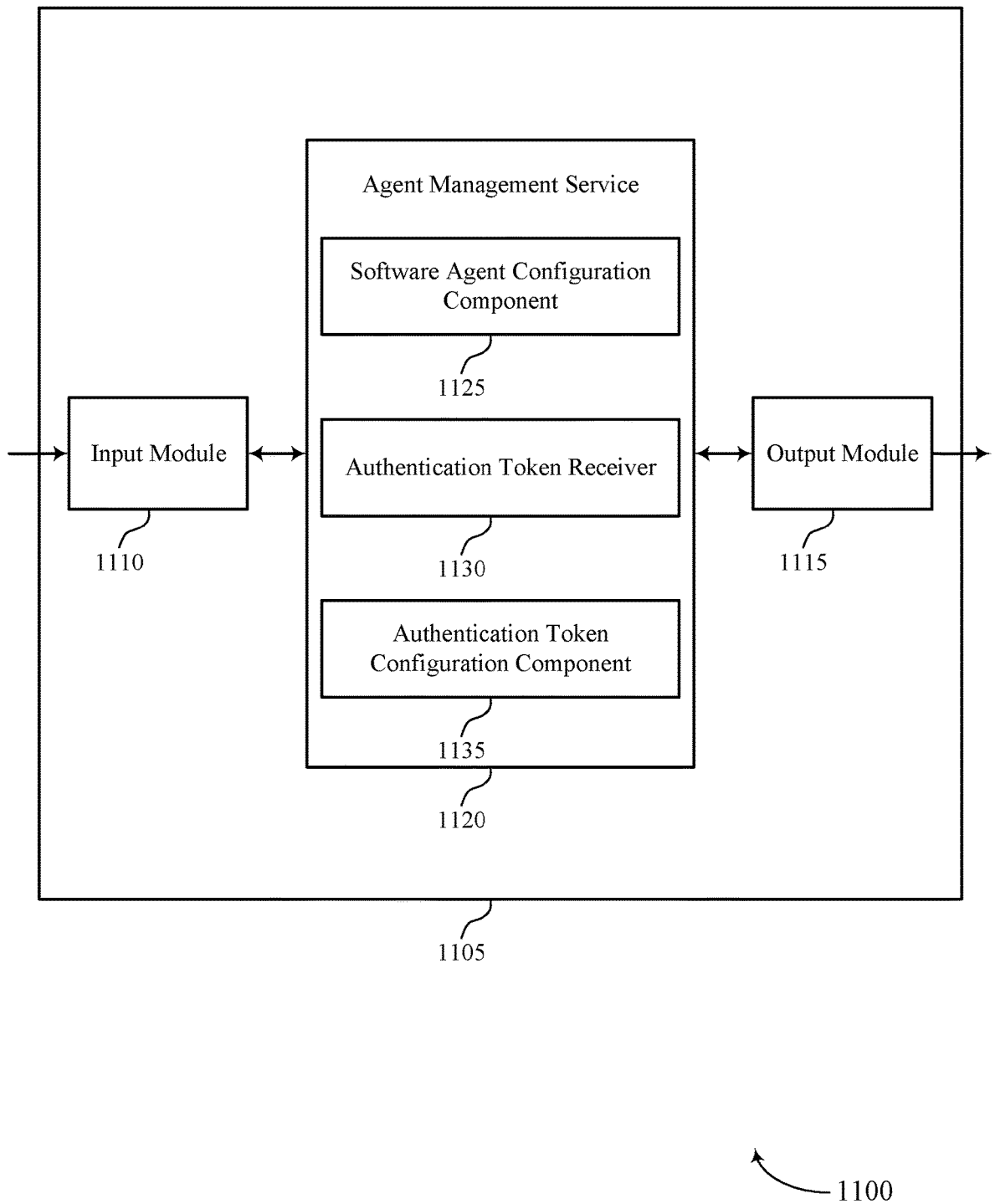
FIG. 11 shows a block diagram of an apparatus that supports techniques for managing AI agents using UCAN tokens in accordance with aspects of the present disclosure.

FIG. 11 shows a block diagram 1100 of a device 1105 that supports techniques for managing AI agents using UCAN tokens in accordance with aspects of the present disclosure. The device 1105 may include an input module 1110, an output module 1115, and an agent management service 1120. The device 1105, or one or more components of the device 1105 (e.g., the input module 1110, the output module 1115, the agent management service 1120), may include at least one processor, which may be coupled with at least one memory, to support the described techniques. Each of these components may be in communication with one another (e.g., via one or more buses).

The input module 1110 may manage input signals for the device 1105. For example, the input module 1110 may identify input signals based on an interaction with a modem, a keyboard, a mouse, a touchscreen, or a similar device. These input signals may be associated with user input or processing at other components or devices. In some cases, the input module 1110 may utilize an operating system such as iOS®, ANDROID®, MS-DOS®, MS-WINDOWS®, OS/2®, UNIX®, LINUX®, or another known operating system to handle input signals. The input module 1110 may send aspects of these input signals to other components of the device 1105 for processing. For example, the input module 1110 may transmit input signals to the agent management service 1120 to support techniques for managing AI agents using UCAN tokens. In some cases, the input module 1110 may be a component of an input/output (I/O) controller 1310 as described with reference to FIG. 13.

The output module 1115 may manage output signals for the device 1105. For example, the output module 1115 may receive signals from other components of the device 1105, such as the agent management service 1120, and may transmit these signals to other components or devices. In some examples, the output module 1115 may transmit output signals for display in a user interface, for storage in a database or data store, for further processing at a server or server cluster, or for any other processes at any number of devices or systems. In some cases, the output module 1115 may be a component of an I/O controller 1310 as described with reference to FIG. 13.

For example, the agent management service 1120 may include a software agent configuration component 1125, an authentication token receiver 1130, an authentication token configuration component 1135, or any combination thereof. In some examples, the agent management service 1120, or various components thereof, may be configured to perform various operations (e.g., receiving, monitoring, transmitting) using or otherwise in cooperation with the input module 1110, the output module 1115, or both. For example, the agent management service 1120 may receive information from the input module 1110, send information to the output module 1115, or be integrated in combination with the input module 1110, the output module 1115, or both to receive information, transmit information, or perform various other operations as described herein.

The agent management service 1120 may support software agent authorization in accordance with examples as disclosed herein. The software agent configuration component 1125 may be configured to support configuring, within one or more user interfaces of an agent management service, a first software agent with a set of parameters, the set of parameters including at least an identifier of an API endpoint of a first service that the first software agent is authorized to query and one or more permissions associated with queries to the API endpoint by the first software agent. The authentication token receiver 1130 may be configured to support receiving, from the agent management service, an authentication token for the first software agent, the authentication token being usable by the first software agent for accessing resources of the first service via the API endpoint in accordance with the one or more permissions. The authentication token configuration component 1135 may be configured to support configuring the first software agent with the authentication token to enable the first software agent to perform the queries to the API endpoint of the first service.

Figure 12:
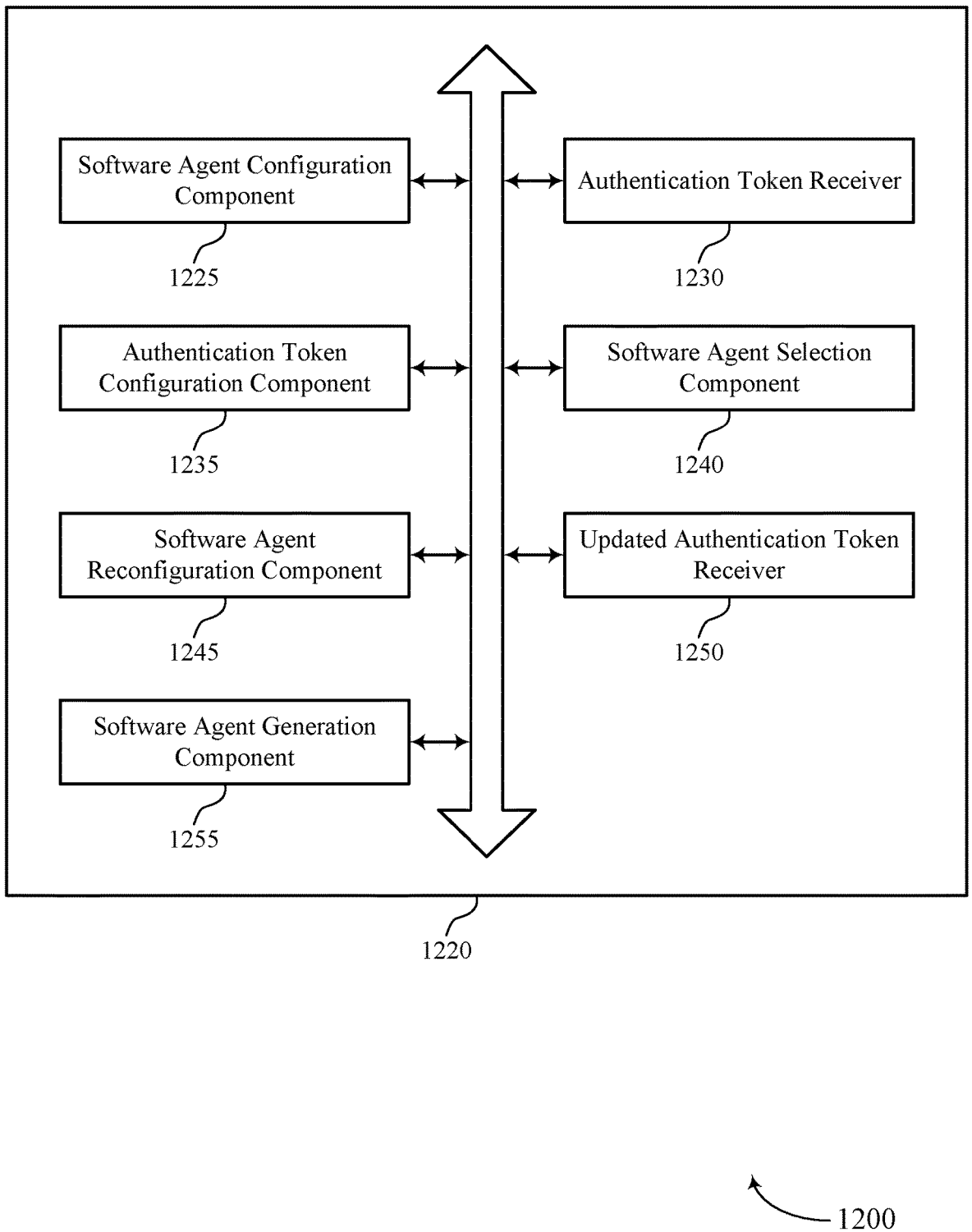
FIG. 12 shows a block diagram of an agent management service that supports techniques for managing AI agents using UCAN tokens in accordance with aspects of the present disclosure.

FIG. 12 shows a block diagram 1200 of an agent management service 1220 that supports techniques for managing AI agents using UCAN tokens in accordance with aspects of the present disclosure. The agent management service 1220 may be an example of aspects of an agent management service or an agent management service 1120, or both, as described herein. The agent management service 1220, or various components thereof, may be an example of means for performing various aspects of techniques for managing AI agents using UCAN tokens as described herein. For example, the agent management service 1220 may include a software agent configuration component 1225, an authentication token receiver 1230, an authentication token configuration component 1235, a software agent selection component 1240, a software agent reconfiguration component 1245, an updated authentication token receiver 1250, a software agent generation component 1255, or any combination thereof. Each of these components, or components of subcomponents thereof (e.g., one or more processors, one or more memories), may communicate, directly or indirectly, with one another (e.g., via one or more buses).

The agent management service 1220 may support software agent authorization in accordance with examples as disclosed herein. The software agent configuration component 1225 may be configured to support configuring, within one or more user interfaces of an agent management service, a first software agent with a set of parameters, the set of parameters including at least an identifier of an API endpoint of a first service that the first software agent is authorized to query and one or more permissions associated with queries to the API endpoint by the first software agent. The authentication token receiver 1230 may be configured to support receiving, from the agent management service, an authentication token for the first software agent, the authentication token being usable by the first software agent for accessing resources of the first service via the API endpoint in accordance with the one or more permissions. The authentication token configuration component 1235 may be configured to support configuring the first software agent with the authentication token to enable the first software agent to perform the queries to the API endpoint of the first service.

In some examples, the software agent selection component 1240 may be configured to support selecting, within a first user interface of the one or more user interfaces of the agent management service, the first software agent from one or more software agents displayed within the first user interface. In some examples, the software agent reconfiguration component 1245 may be configured to support reconfiguring, within a second user interface of the agent management service, the first software agent based on selecting the first software agent from the one or more software agents. In some examples, the updated authentication token receiver 1250 may be configured to support receiving, from the agent management service, an updated authentication token for the first software agent based on the reconfiguration of the first software agent, where the first software agent is configured with the updated authentication token to perform the queries to the API endpoint of the first service.

In some examples, the software agent reconfiguration component 1245 may be configured to support reconfiguring the first software agent includes updating the identifier of the API endpoint of the first service and the one or more permissions associated with the queries to the API endpoint by the first software agent, adding another identifier of a second API endpoint of a second service that the first software agent is authorized to query and one or more permissions associated with queries to the second API endpoint by the first software agent, removing one or more parameters of the first software agent, or any combination thereof.

In some examples, the software agent generation component 1255 may be configured to support selecting, within a first user interface of the one or more user interfaces of the agent management service, to generate the first software agent, the first software agent being configured within the first user interface of the agent management service based on the selection within the first user interface of the agent management service.

In some examples, to support configuring the first software agent via the agent management service, the software agent configuration component 1225 may be configured to support inputting, within a first user interface of the one or more user interfaces of the agent management service, an identifier for the first software agent. In some examples, to support configuring the first software agent via the agent management service, the software agent configuration component 1225 may be configured to support inputting, within a second user interface of the one or more user interfaces of the agent management service, an identifier of the first service, the API endpoint of the first service, the one or more permissions associated with the queries to the API endpoint by the first software agent, or any combination thereof. In some examples, to support configuring the first software agent via the agent management service, the software agent configuration component 1225 may be configured to support receiving, via a third user interface of the one or more user interfaces of the agent management service, an indication of a client identifier and a secret token for the first software agent, where the authentication token is generated based on the client identifier and the secret token of the first software agent.

In some examples, to support receiving the authentication token for the first software agent, the authentication token receiver 1230 may be configured to support receiving, from the agent management service, a header, a payload, and a signature of the authentication token, where a portion of the payload of the authentication token includes the API endpoint of the first service, where the signature of the authentication token includes a private key, and where the authentication token is usable by the first software agent for accessing the resources of the first service via the API endpoint of the first service based on the portion of the payload including the API endpoint of the first service being associated with the signature of the authentication token.

In some examples, the one or more permissions include read permissions, write permissions, creation permissions, deletion permissions, or any combination thereof.

In some examples, the first software agent performs the queries to the API endpoint of the first service on behalf of a first user of a set of users.

In some examples, the first service includes a native application or a web-based application.

In some examples, the agent management service includes an application, a dashboard of an application, a user interface of an application, or any combination thereof.

Figure 13:
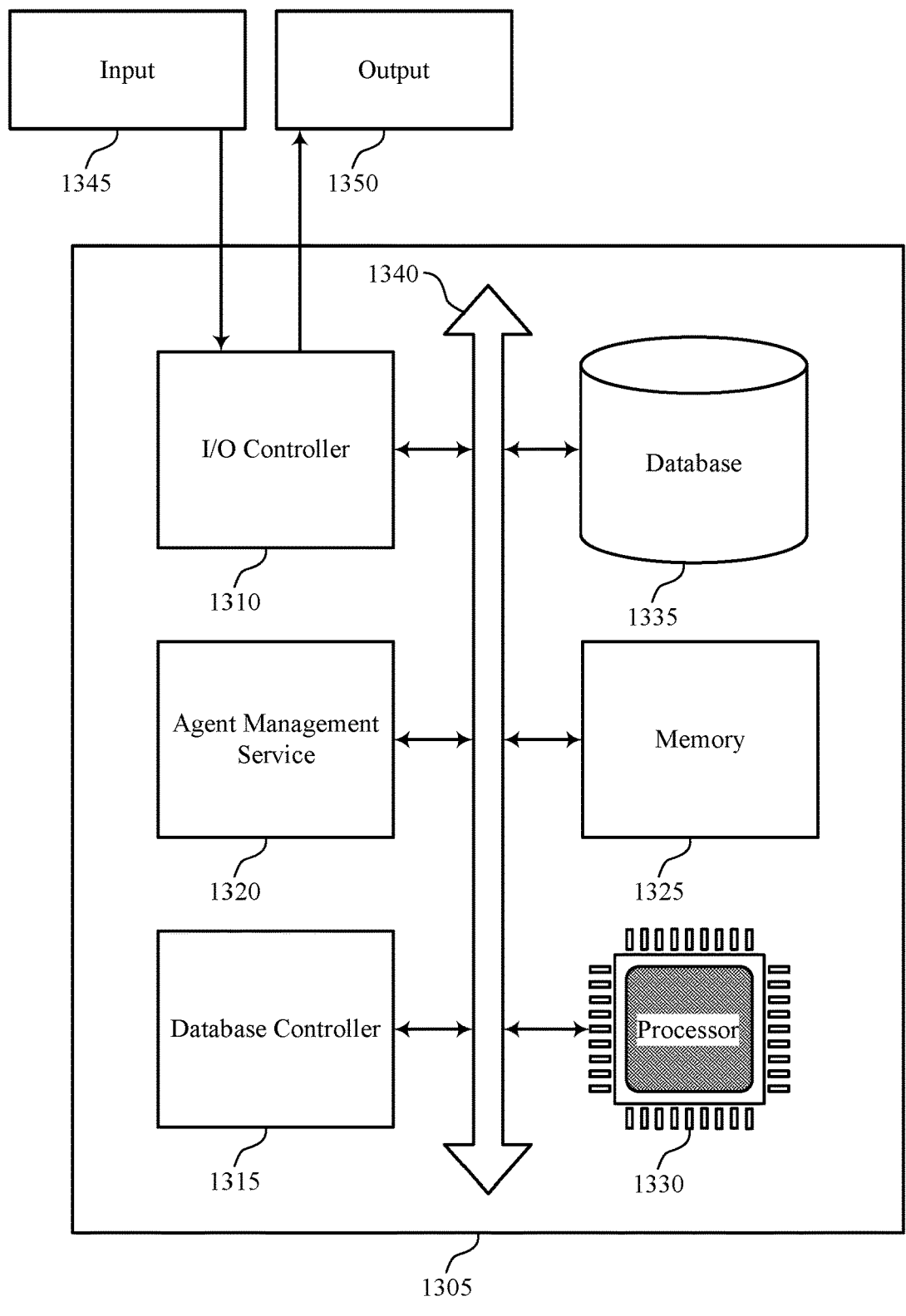
FIG. 13 shows a diagram of a system including a device that supports techniques for managing AI agents using UCAN tokens in accordance with aspects of the present disclosure.

FIG. 13 shows a diagram of a system 1300 including a device 1305 that supports techniques for managing AI agents using UCAN tokens in accordance with aspects of the present disclosure. The device 1305 may be an example of or include components of a device 1105 as described herein. The device 1305 may include components for bi-directional voice and data communications including components for transmitting and receiving communications, such as an agent management service 1320, an I/O controller, such as an I/O controller 1310, a database controller 1315, at least one memory 1325, at least one processor 1330, and a database 1335. These components may be in electronic communication or otherwise coupled (e.g., operatively, communicatively, functionally, electronically, electrically) via one or more buses (e.g., a bus 1340).

The I/O controller 1310 may manage input signals 1345 and output signals 1350 for the device 1305. The I/O controller 1310 may also manage peripherals not integrated into the device 1305. In some cases, the I/O controller 1310 may represent a physical connection or port to an external peripheral. In some cases, the I/O controller 1310 may utilize an operating system such as iOS®, ANDROID®, MS-DOS®, MS-WINDOWS®, OS/2®, UNIX®, LINUX®, or another known operating system. In other cases, the I/O controller 1310 may represent or interact with a modem, a keyboard, a mouse, a touchscreen, or a similar device. In some cases, the I/O controller 1310 may be implemented as part of a processor 1330. In some examples, a user may interact with the device 1305 via the I/O controller 1310 or via hardware components controlled by the I/O controller 1310.

The database controller 1315 may manage data storage and processing in a database 1335. In some cases, a user may interact with the database controller 1315. In other cases, the database controller 1315 may operate automatically without user interaction. The database 1335 may be an example of a single database, a distributed database, multiple distributed databases, a data store, a data lake, or an emergency backup database.

Memory 1325 may include random-access memory (RAM) and read-only memory (ROM). The memory 1325 may store computer-readable, computer-executable software including instructions that, when executed, cause at least one processor 1330 to perform various functions described herein. In some cases, the memory 1325 may contain, among other things, a basic I/O system (BIOS) which may control basic hardware or software operation such as the interaction with peripheral components or devices. The memory 1325 may be an example of a single memory or multiple memories. For example, the device 1305 may include one or more memories 1325.

The processor 1330 may include an intelligent hardware device (e.g., a general-purpose processor, a digital signal processor (DSP), a central processing unit (CPU), a microcontroller, an application-specific integrated circuit (ASIC), a field-programmable gate array (FPGA), a programmable logic device, a discrete gate or transistor logic component, a discrete hardware component, or any combination thereof). In some cases, the processor 1330 may be configured to operate a memory array using a memory controller. In other cases, a memory controller may be integrated into the processor 1330. The processor 1330 may be configured to execute computer-readable instructions stored in at least one memory 1325 to perform various functions (e.g., functions or tasks supporting techniques for managing AI agents using UCAN tokens). The processor 1330 may be an example of a single processor or multiple processors. For example, the device 1305 may include one or more processors 1330.

The agent management service 1320 may support software agent authorization in accordance with examples as disclosed herein. For example, the agent management service 1320 may be configured to support configuring, within one or more user interfaces of an agent management service, a first software agent with a set of parameters, the set of parameters including at least an identifier of an API endpoint of a first service that the first software agent is authorized to query and one or more permissions associated with queries to the API endpoint by the first software agent. The agent management service 1320 may be configured to support receiving, from the agent management service, an authentication token for the first software agent, the authentication token being usable by the first software agent for accessing resources of the first service via the API endpoint in accordance with the one or more permissions. The agent management service 1320 may be configured to support configuring the first software agent with the authentication token to enable the first software agent to perform the queries to the API endpoint of the first service.

By including or configuring the agent management service 1320 in accordance with examples as described herein, the device 1305 may support techniques for a user 185 using an agent management service and authentication tokens with software agents to reduce security vulnerabilities and increase the security, reliability, and effectiveness of the computing system that includes the agent management service.

Figure 14:
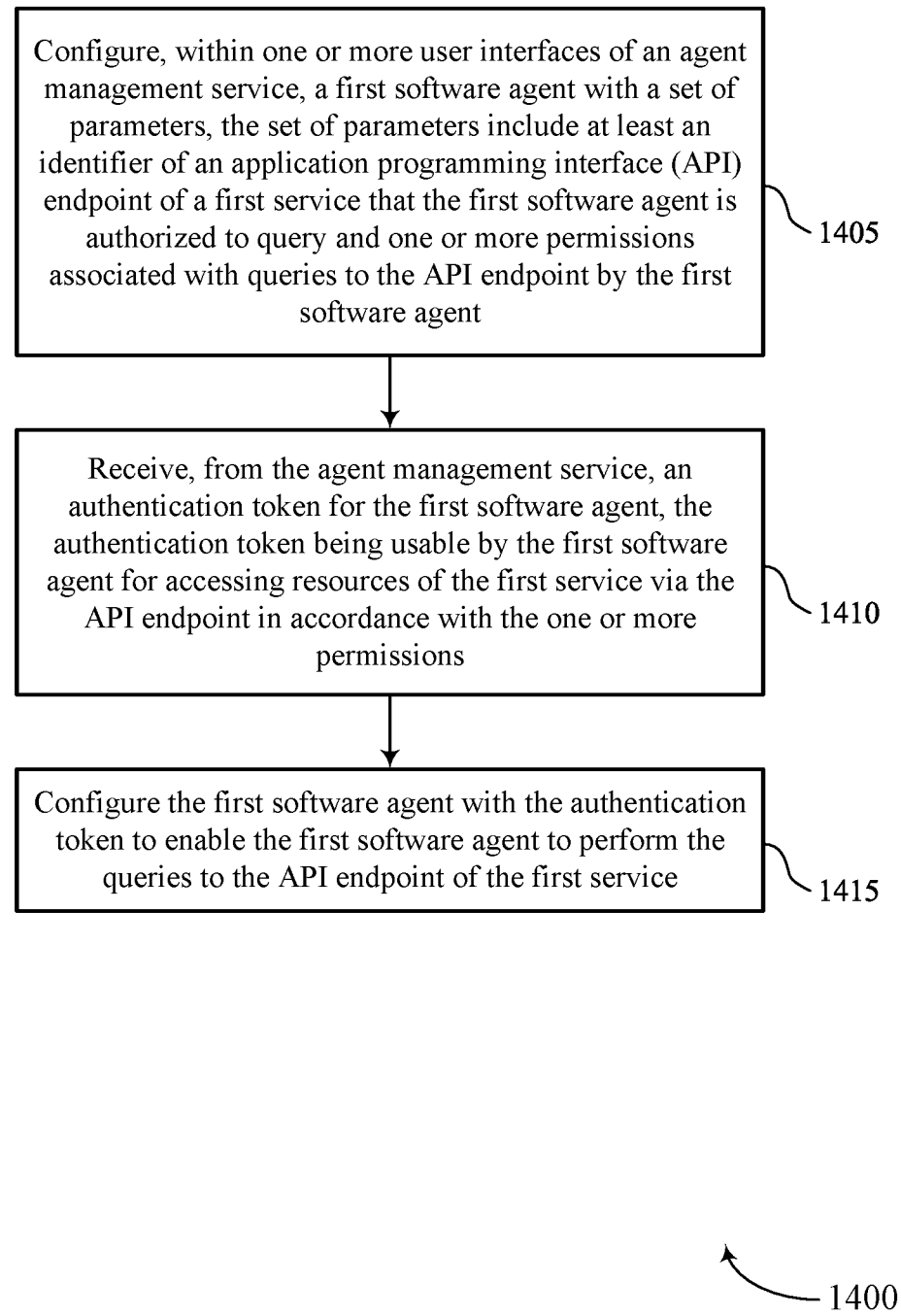
FIG. 14 shows a flowchart illustrating methods that support techniques for managing artificial intelligence agents using UCAN tokens in accordance with aspects of the present disclosure.

FIG. 14 shows a flowchart illustrating a method 1400 that supports techniques for managing AI agents using UCAN tokens in accordance with aspects of the present disclosure. The operations of the method 1400 may be implemented by a computing device or its components as described herein. For example, the operations of the method 1400 may be performed by a computing device as described with reference to FIGS. 1 through 13. In some examples, a computing device may execute a set of instructions to control the functional elements of the computing device to perform the described functions. Additionally, or alternatively, the computing device may perform aspects of the described functions using special-purpose hardware.

At 1405, the method may include configuring, within one or more user interfaces of an agent management service, a first software agent with a set of parameters, the set of parameters including at least an identifier of an API endpoint of a first service that the first software agent is authorized to query and one or more permissions associated with queries to the API endpoint by the first software agent. The operations of 1405 may be performed in accordance with examples as disclosed herein. In some examples, aspects of the operations of 1405 may be performed by a software agent configuration component 1225 as described with reference to FIG. 12.

At 1410, the method may include receiving, from the agent management service, an authentication token for the first software agent, the authentication token being usable by the first software agent for accessing resources of the first service via the API endpoint in accordance with the one or more permissions. The operations of 1410 may be performed in accordance with examples as disclosed herein. In some examples, aspects of the operations of 1410 may be performed by an authentication token receiver 1230 as described with reference to FIG. 12.

At 1415, the method may include configuring the first software agent with the authentication token to enable the first software agent to perform the queries to the API endpoint of the first service. The operations of 1415 may be performed in accordance with examples as disclosed herein. In some examples, aspects of the operations of 1415 may be performed by an authentication token configuration component 1235 as described with reference to FIG. 12.

The following provides an overview of aspects of the present disclosure:

Aspect 1: A method for software agent authorization, comprising: configuring, within one or more user interfaces of an agent management service, a first software agent with a set of parameters, the set of parameters including at least an identifier of an API endpoint of a first service that the first software agent is authorized to query and one or more permissions associated with queries to the API endpoint by the first software agent; receiving, from the agent management service, an authentication token for the first software agent, the authentication token being usable by the first software agent for accessing resources of the first service via the API endpoint in accordance with the one or more permissions; and configuring the first software agent with the authentication token to enable the first software agent to perform the queries to the API endpoint of the first service.

Aspect 2: The method of aspect 1, further comprising: selecting, within a first user interface of the one or more user interfaces of the agent management service, the first software agent from one or more software agents displayed within the first user interface; reconfiguring, within a second user interface of the agent management service, the first software agent based at least in part on selecting the first software agent from the one or more software agents; and receiving, from the agent management service, an updated authentication token for the first software agent based at least in part on the reconfiguration of the first software agent, wherein the first software agent is configured with the updated authentication token to perform the queries to the API endpoint of the first service.

Aspect 3: The method of aspect 2, further comprising: reconfiguring the first software agent comprises updating the identifier of the API endpoint of the first service and the one or more permissions associated with the queries to the API endpoint by the first software agent, adding another identifier of a second API endpoint of a second service that the first software agent is authorized to query and one or more permissions associated with queries to the second API endpoint by the first software agent, removing one or more parameters of the first software agent, or any combination thereof.

Aspect 4: The method of any of aspects 1 through 3, further comprising: selecting, within a first user interface of the one or more user interfaces of the agent management service, to generate the first software agent, the first software agent being configured within the first user interface of the agent management service based at least in part on the selection within the first user interface of the agent management service.

Aspect 5: The method of any of aspects 1 through 4, wherein configuring the first software agent via the agent management service comprises: inputting, within a first user interface of the one or more user interfaces of the agent management service, an identifier for the first software agent; inputting, within a second user interface of the one or more user interfaces of the agent management service, an identifier of the first service, the API endpoint of the first service, the one or more permissions associated with the queries to the API endpoint by the first software agent, or any combination thereof; and receiving, via a third user interface of the one or more user interfaces of the agent management service, an indication of a client identifier and a secret token for the first software agent, wherein the authentication token is generated based at least in part on the client identifier and the secret token of the first software agent.

Aspect 6: The method of aspect 5, wherein receiving the authentication token for the first software agent comprises: receiving, from the agent management service, a header, a payload, and a signature of the authentication token, wherein a portion of the payload of the authentication token comprises the API endpoint of the first service, wherein the signature of the authentication token comprises a private key, and wherein the authentication token is usable by the first software agent for accessing the resources of the first service via the API endpoint of the first service based at least in part on the portion of the payload comprising the API endpoint of the first service being associated with the signature of the authentication token.

Aspect 7: The method of any of aspects 1 through 6, wherein the one or more permissions include read permissions, write permissions, creation permissions, deletion permissions, or any combination thereof.

Aspect 8: The method of any of aspects 1 through 7, wherein the first software agent performs the queries to the API endpoint of the first service on behalf of a first user of a set of users.

Aspect 9: The method of any of aspects 1 through 8, wherein the first service comprises a native application or a web-based application.

Aspect 10: The method of any of aspects 1 through 9, wherein the agent management service comprises an application, a dashboard of an application, a user interface of an application, or any combination thereof.

Aspect 11: An apparatus for software agent authorization, comprising one or more memories storing processor-executable code, and one or more processors coupled with the one or more memories and individually or collectively operable to execute the code to cause the apparatus to perform a method of any of aspects 1 through 10.

Aspect 12: An apparatus for software agent authorization, comprising at least one means for performing a method of any of aspects 1 through 10.

Aspect 13: A non-transitory computer-readable medium storing code for software agent authorization, the code comprising instructions executable by one or more processors to perform a method of any of aspects 1 through 10.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations, and does not represent all the examples that may be implemented, or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by one or more processors, firmware, or any combination thereof. If implemented in software executed by one or more processors, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for software agent authorization, comprising:
configuring, within one or more user interfaces of an agent management service, a first software agent with a set of parameters, the set of parameters including at least an identifier of an application programming interface (API) endpoint of a first service that the first software agent is authorized to query and one or more permissions associated with queries to the API endpoint by the first software agent;
receiving, from the agent management service, an authentication token for the first software agent, the authentication token being usable by the first software agent for accessing resources of the first service via the API endpoint in accordance with the one or more permissions; and configuring the first software agent with the authentication token to enable the first software agent to perform the queries to the API endpoint of the first service.

2. The method of claim 1, further comprising:
selecting, within a first user interface of the one or more user interfaces of the agent management service, the first software agent from one or more software agents displayed within the first user interface;
reconfiguring, within a second user interface of the agent management service, the first software agent based at least in part on selecting the first software agent from the one or more software agents; and
receiving, from the agent management service, an updated authentication token for the first software agent based at least in part on the reconfiguration of the first software agent, wherein the first software agent is configured with the updated authentication token to perform the queries to the API endpoint of the first service.

3. The method of claim 2, further comprising:
reconfiguring the first software agent comprises updating the identifier of the API endpoint of the first service and the one or more permissions associated with the queries to the API endpoint by the first software agent, adding another identifier of a second API endpoint of a second service that the first software agent is authorized to query and one or more permissions associated with queries to the second API endpoint by the first software agent, removing one or more parameters of the first software agent, or any combination thereof.

4. The method of claim 1, further comprising:
selecting, within a first user interface of the one or more user interfaces of the agent management service, to generate the first software agent, the first software agent being configured within the first user interface of the agent management service based at least in part on the selection within the first user interface of the agent management service.

5. The method of claim 1, wherein configuring the first software agent via the agent management service comprises:
inputting, within a first user interface of the one or more user interfaces of the agent management service, an identifier for the first software agent;
inputting, within a second user interface of the one or more user interfaces of the agent management service, an identifier of the first service, the API endpoint of the first service, the one or more permissions associated with the queries to the API endpoint by the first software agent, or any combination thereof; and
receiving, via a third user interface of the one or more user interfaces of the agent management service, an indication of a client identifier and a secret token for the first software agent, wherein the authentication token is generated based at least in part on the client identifier and the secret token of the first software agent.

6. The method of claim 5, wherein receiving the authentication token for the first software agent comprises:
receiving, from the agent management service, a header, a payload, and a signature of the authentication token, wherein a portion of the payload of the authentication token comprises the API endpoint of the first service, wherein the signature of the authentication token comprises a private key, and wherein the authentication token is usable by the first software agent for accessing the resources of the first service via the API endpoint of the first service based at least in part on the portion of the payload comprising the API endpoint of the first service being associated with the signature of the authentication token.

7. The method of claim 1, wherein the one or more permissions include read permissions, write permissions, creation permissions, deletion permissions, or any combination thereof.

8. The method of claim 1, wherein the first software agent performs the queries to the API endpoint of the first service on behalf of a first user of a set of users.

9. The method of claim 1, wherein the first service comprises a native application or a web-based application.

10. The method of claim 1, wherein the agent management service comprises an application, a dashboard of an application, a user interface of an application, or any combination thereof.

11. An apparatus for software agent authorization, comprising:
one or more memories storing processor-executable code; and
one or more processors coupled with the one or more memories and individually or collectively operable to execute the code to cause the apparatus to:
configure, within one or more user interfaces of an agent management service, a first software agent with a set of parameters, the set of parameters include at least an identifier of an application programming interface (API) endpoint of a first service that the first software agent is authorized to query and one or more permissions associated with queries to the API endpoint by the first software agent;
receive, from the agent management service, an authentication token for the first software agent, the authentication token being usable by the first software agent for accessing resources of the first service via the API endpoint in accordance with the one or more permissions; and
configure the first software agent with the authentication token to enable the first software agent to perform the queries to the API endpoint of the first service.

12. The apparatus of claim 11, wherein the one or more processors are individually or collectively further operable to execute the code to cause the apparatus to:
select, within a first user interface of the one or more user interfaces of the agent management service, the first software agent from one or more software agents displayed within the first user interface;
reconfigure, within a second user interface of the agent management service, the first software agent based at least in part on selecting the first software agent from the one or more software agents; and
receive, from the agent management service, an updated authentication token for the first software agent based at least in part on the reconfiguration of the first software agent, wherein the first software agent is configured with the updated authentication token to perform the queries to the API endpoint of the first service.

13. The apparatus of claim 11, wherein the one or more processors are individually or collectively further operable to execute the code to cause the apparatus to:
select, within a first user interface of the one or more user interfaces of the agent management service, to generate the first software agent, the first software agent being configured within the first user interface of the agent management service based at least in part on the selection within the first user interface of the agent management service.

14. The apparatus of claim 11, wherein, to configure the first software agent via the agent management service, the one or more processors are individually or collectively operable to execute the code to cause the apparatus to:

input, within a first user interface of the one or more user interfaces of the agent management service, an identifier for the first software agent;

input, within a second user interface of the one or more user interfaces of the agent management service, an identifier of the first service, the API endpoint of the first service, the one or more permissions associated with the queries to the API endpoint by the first software agent, or any combination thereof; and receive, via a third user interface of the one or more user interfaces of the agent management service, an indication of a client identifier and a secret token for the first software agent, wherein the authentication token is generated based at least in part on the client identifier and the secret token of the first software agent.

15. The apparatus of claim 11, wherein the first software agent performs the queries to the API endpoint of the first service on behalf of a first user of a set of users.

16. A non-transitory computer-readable medium storing code for software agent authorization, the code comprising instructions executable by one or more processors to:

configure, within one or more user interfaces of an agent management service, a first software agent with a set of parameters, the set of parameters include at least an identifier of an application programming interface (API) endpoint of a first service that the first software agent is authorized to query and one or more permissions associated with queries to the API endpoint by the first software agent;

receive, from the agent management service, an authentication token for the first software agent, the authentication token being usable by the first software agent for accessing resources of the first service via the API endpoint in accordance with the one or more permissions; and configure the first software agent with the authentication token to enable the first software agent to perform the queries to the API endpoint of the first service.

17. The non-transitory computer-readable medium of claim 16, wherein the instructions are further executable by the one or more processors to:

select, within a first user interface of the one or more user interfaces of the agent management service, the first software agent from one or more software agents displayed within the first user interface;

reconfigure, within a second user interface of the agent management service, the first software agent based at least in part on selecting the first software agent from the one or more software agents; and receive, from the agent management service, an updated authentication token for the first software agent based at least in part on the reconfiguration of the first software agent, wherein the first software agent is configured with the updated authentication token to perform the queries to the API endpoint of the first service.

18. The non-transitory computer-readable medium of claim 16, wherein the instructions are further executable by the one or more processors to:

select, within a first user interface of the one or more user interfaces of the agent management service, to generate the first software agent, the first software agent being configured within the first user interface of the agent management service based at least in part on the selection within the first user interface of the agent management service.

19. The non-transitory computer-readable medium of claim 16, wherein the instructions to configure the first software agent via the agent management service are executable by the one or more processors to:

input, within a first user interface of the one or more user interfaces of the agent management service, an identifier for the first software agent;

input, within a second user interface of the one or more user interfaces of the agent management service, an identifier of the first service, the API endpoint of the first service, the one or more permissions associated with the queries to the API endpoint by the first software agent, or any combination thereof; and receive, via a third user interface of the one or more user interfaces of the agent management service, an indication of a client identifier and a secret token for the first software agent, wherein the authentication token is generated based at least in part on the client identifier and the secret token of the first software agent.

20. The non-transitory computer-readable medium of claim 16, wherein the first software agent performs the queries to the API endpoint of the first service on behalf of a first user of a set of users.

\* \* \* \* \*